United States Patent
Feng et al.

(10) Patent No.: US 10,404,417 B2
(45) Date of Patent: Sep. 3, 2019

(54) HARQ FEEDBACK MECHANISM FOR CARRIER AGGREGATION BEYOND 5 CARRIERS

(71) Applicant: Panasonic Intellectual Property Corporation of America, Torrance, CA (US)

(72) Inventors: Sujuan Feng, Frankfurt (DE); Michael Einhaus, Darmstadt (DE); Alexander Golitschek Elder von Elbwart, Hessen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 13 days.

(21) Appl. No.: 15/557,041

(22) PCT Filed: Feb. 23, 2016

(86) PCT No.: PCT/EP2016/053774
§ 371 (c)(1),
(2) Date: Sep. 8, 2017

(87) PCT Pub. No.: WO2016/146352
PCT Pub. Date: Sep. 22, 2016

(65) Prior Publication Data
US 2018/0062796 A1 Mar. 1, 2018

(30) Foreign Application Priority Data
Mar. 18, 2015 (EP) ..................................... 15159719

(51) Int. Cl.
*H04L 1/18* (2006.01)
*H04L 5/00* (2006.01)
(Continued)

(52) U.S. Cl.
CPC ......... *H04L 1/1812* (2013.01); *H04B 7/0621* (2013.01); *H04L 1/1861* (2013.01);
(Continued)

(58) Field of Classification Search
None
See application file for complete search history.

(56) References Cited

U.S. PATENT DOCUMENTS

2012/0134305 A1    5/2012  Damnjanovic et al.

FOREIGN PATENT DOCUMENTS

WO    2011/127100 A1    10/2011

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
(Continued)

Primary Examiner — Chi H Pham
Assistant Examiner — Raul Rivas
(74) Attorney, Agent, or Firm — Seed IP Law Group LLP

(57) ABSTRACT

The disclosure relates to a method for providing, by a UE, feedback information of a retransmission protocol to a radio base station, the UE being configured with at least two cells. A least one cell bundling group is defined for the UE such that one of the at least one cell bundling group is associated with at least two out of the at least two cells. The UE communicates with the radio base station to receive downlink transmissions via at least one of the at least two cells. The UE operates a retransmission protocol with the radio base station to provide feedback information for the downlink communication. For each cell bundling group, the UE bundles feedback information generated in connection with those cells being associated with the respective cell bundling
(Continued)

group so as to generate bundled feedback information per cell bundling group. The UE transmits the bundled feedback information of each cell bundling group to the radio base station.

13 Claims, 16 Drawing Sheets

(51) Int. Cl.
H04B 7/06 (2006.01)
H04W 72/04 (2009.01)
(52) U.S. Cl.
CPC ....... *H04L 5/0055* (2013.01); *H04W 72/0413* (2013.01); *H04L 5/001* (2013.01); *H04W 72/0446* (2013.01)

(56) References Cited

OTHER PUBLICATIONS

3GPP TS 36.211 V12.4.0, "3$^{rd}$ Generation Partnership Project; Technical Specification Group Radio Access Network; Evolved Universal Terrestrial Radio Access (E-UTRA); Physical channels and modulation (Release 12)," Dec. 2014, 124 pages.

3GPP TS 36.213 V12.1.0, "3$^{rd}$ Generation Partnership Project; Technical Specification Group Radio Access Network; Evolved Universal Terrestrial Radio Access (E-UTRA); Physical layer procedures (Release 12)," Mar. 2014, 186 pages.

3GPP TS 36.213 V12.4.0, "3$^{rd}$ Generation Partnership Project; Technical Specification Group Radio Access Network; Evolved Universal Terrestrial Radio Access (E-UTRA); Physical layer procedures (Release 12)," Dec. 2014, 225 pages.

Alcatel-Lucent, Alcatel-Lucent Shanghai Bell, Coolpad, Ericsson, ETRI, Huawei, HiSilicon, IAESI, InterDigital, LG, Nokia Corporation, Nokia Networks, Qualcomm, NTT Docomo, Panasonic, Samsung, TI, Verizon Wireless, ZTE, "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Oct. 6-10, 2014, 26 pages.

Ericsson, "UL control signaling enhancements for up to 32 CCs," R1-150324, 3GPP TSG-RAN WG1#80, Agenda Item: 7.2.2.2.3, Athens, Greece, Feb. 9-13, 2015, 4 pages.

Extended European Search Report, dated Aug. 25, 2015, for corresponding European Application No. 15159719.2-1851, 10 pages.

International Search Report, dated Apr. 29, 2016, for corresponding International Application No. PCT/EP2016/053774, 3 pages.

LG Electronics, "HARDQ-ACK transmission for supporting CA of up to 32 carriers," R1-150209, 3GPP TSG RAN WG1 meeting #80, Agenda Item: 7.2.2.2.3, Athens, Greece, Feb. 9-13, 2015, 6 pages.

Nokia Corporation, NTT DoCoMo Inc., Nokia Networks, New WI proposal: LTE Carrier Aggregation Enhancement Beyond 5 Carriers, RP-142286, 3GPP TSG RAN Meeting #66, Agenda Item: 14.1.1, Maui, Hawaii (US), Dec. 8-11, 2014, 9 pages.

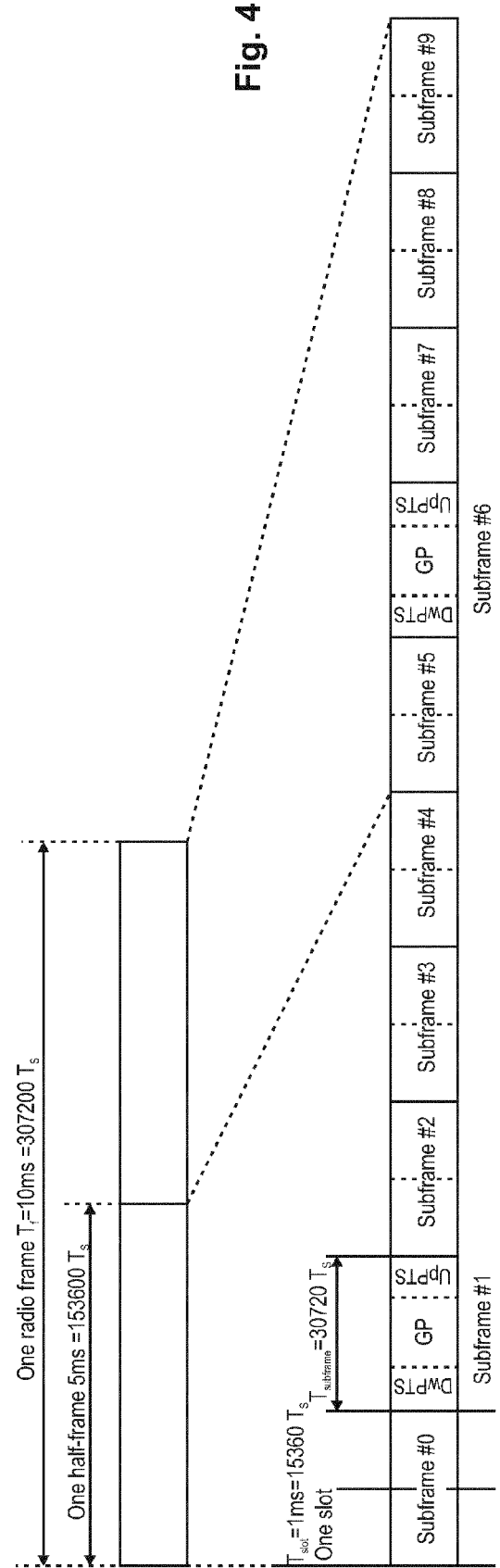

| Uplink-Downlink configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

| 7 | negative offset to identify subframe from which ACK/NACK(s) is pending

| Uplink-Downlink configuration | Subframe Number | | | | | | | | | |
|---|---|---|---|---|---|---|---|---|---|---|
| | 20 | 21 | 22 | 23 | 24 | 25 | 26 | 27 | 28 | 29 |
| 0 | | | 16 | | 20 | | | 21 | | 25 |
| 1 | | | 15, 16 | 19 | | | | 20, 21 | 24 | |
| 2 | | | 14, 15, 18, 16 | | | | | 19, 20, 23, 21 | | |
| 3 | | | 15, 16, 11 | 17, 18 | 19, 20 | | | | | |
| 4 | | | 10, 14, 15, 11 | 17, 18, 19, 16 | | | | | | |
| 5 | | | 9, 10, 13, 14, 15, 17, 18, 11, 16 | | | | | | | |
| 6 | | | 15 | 16 | 19 | | | 20 | 21 | |

| 16 | subframe index of the ACK/NACK pending for that subframe

HARQ FEEDBACK MECHANISM FOR CARRIER AGGREGATION BEYOND 5 CARRIERS

BACKGROUND

Technical Field

The present disclosure relates to methods for providing feedback information of a retransmission protocol to a radio base station. The present disclosure is also providing the user equipment and base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers.

In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:

1. For each SCell the usage of uplink resources by the UE in addition to the downlink ones is configurable (the number of DL SCCs configured is therefore always larger or equal to the number of UL SCCs, and no SCell can be configured for usage of uplink resources only)

2. The downlink PCell cannot be de-activated, unlike SCells

3. Re-establishment is triggered when the downlink PCell experiences Rayleigh fading (RLF), not when downlink SCells experience RLF 4. Non-access stratum information is taken from the downlink PCell 5. PCell can only be changed with handover procedure (i.e., with security key change and RACH procedure)

6. PCell is used for transmission of PUCCH

7. The uplink PCell is used for transmission of Layer 1 uplink control information 8. From a UE viewpoint, each uplink resource only belongs to one serving cell.

The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Control Information, PUCCH Formats

In general, uplink control signaling in mobile communication systems can be divided into two categories:

Data-associated control signaling, which is control signaling always transmitted together with uplink data and used in the processing of that data. Examples include transport format indications, New Data Indicator (NDIs) and MIMO parameters.

Control signaling not associated with data is transmitted independently of any uplink data packet. Examples include HARQ Acknowledgements (ACK/NACK) for downlink data packets, Channel Quality Indicators (CQIs) to support link adaptation, and MIMO feedback such as Rank Indicators (RIs) and Precoding Matrix Indicators (PMI) for downlink transmissions. Scheduling Requests (SRs) for uplink transmissions also fall into this category.

Uplink-data-associated control signaling is not necessary in LTE, as the relevant information is already known to the eNodeB. Therefore, only data-non-associated control signaling exists in the LTE uplink. Consequently, the UCI can consist of:

Scheduling Requests (SRs)

HARQ ACK/NACK in response to downlink data packets on the PDSCH (Physical Downlink Shared CHannel). One ACK/NACK bit is transmitted in the case of single-codeword downlink transmission, while two ACK/NACK bits are used in the case of two-codeword downlink transmission.

Channel State Information (CSI) which includes Channel Quality Indicators (CQIs) as well as the MIMO-related feedback consisting of RIs (Rank Indicator) and PMI (Precoding Matrix Indicator). 20 bits per subframe are used for the CSI. Channel state information which is required in the eNB for scheduling of downlink data transmissions.

The amount of UCI a UE can transmit in a subframe depends on the number of SC-FDMA symbols available for transmission of control signaling data. The PUCCH supports eight different formats, depending on the amount of information to be signaled. Information on the PUCCH formats can be found in subclauses 5.4.1, 5.4.2, and 5.4.2A of 3GPP TS 36.211, current version 12.4.0, incorporated herein by reference. Further information on the UE procedure for determining physical uplink control channel assignment can be found in 3GPP TS 36.213, current version 12.4.0, Section 10.1, incorporated herein by reference.

The following table gives a simplified overview of the information that can be found in the standards as identified above.

| PUCCH format | | Bits | UCI information |
|---|---|---|---|
| Format 1 | | | Scheduling Request (SR) |
| Format 1a | | 1 | 1-bit HARQ ACK/NACK with/without SR |
| Format 1b | FDD (1CC) | 2 | 2-bit HARQ ACK/NACK with/without SR (This is for MIMO, 1 bit for each transport block) |
| | FDD (2CC) | 4 | 4-bit HARQ ACK/NACK with channel selection |
| | TDD (1CC) | 4 | 4-bit HARQ ACK/NACK |
| Format 2 | | 20 | CQI (20 coded bits) |
| Format 2 | | 20 | CQI and 1 or 2 bit HARQ ACK/NACK - 20 bits - Extended CP only |
| Format 2a | | 21 | CQI and 1 bit HARQ ACK/NACK - (20 + 1 coded bits) |
| Format 2b | | 22 | CQI and 2 bit HARQ ACK/NACK - (20 + 2 coded bits) |
| Format 3 | FDD (up to 5CC) | 10 | up to 10 bit HARQ ACK |
| | TDD (up to 5CC) | 20 | up to 20 bit HARQ ACK |

-continued

| PUCCH format | | Bits | UCI information |
|---|---|---|---|
| Format 3 | FDD (up to 5CC) | 11 | 11 bit (10 bit HARQ ACK and 1 bit positive/negative SR) |
| | TDD (up to 5CC) | 21 | 21 bit (20 bit HARQ ACK and 1 bit positive/negative SR) |

As already hinted at by the table, the following combinations of uplink control information on PUCCH are supported:
Format 1a for 1-bit HARQ-ACK or in case of FDD for 1-bit HARQ-ACK with positive SR
Format 1b for 2-bit HARQ-ACK or for 2-bit HARQ-ACK with positive SR
Format 1b for up to 4-bit HARQ-ACK with channel selection when the UE is configured with more than one serving cell or, in the case of TDD, when the UE is configured with a single serving cell
Format 1 for positive SR
Format 2 for a CSI report when not multiplexed with HARQ-ACK
Format 2a for a CSI report multiplexed with 1-bit HARQ-ACK for normal cyclic prefix
Format 2b for a CSI report multiplexed with 2-bit HARQ-ACK for normal cyclic prefix
Format 2 for a CSI report multiplexed with HARQ-ACK for extended cyclic prefix
Format 3 for up to 10-bit HARQ-ACK for FDD and for up to 20-bit HARQ-ACK for TDD
Format 3 for up to 11-bit corresponding to 10-bit HARQ-ACK and 1-bit positive/negative SR for FDD and for up to 21-bit corresponding to 20-bit HARQ-ACK and 1-bit positive/negative SR for TDD.
Format 3 for multi-cell HARQ-ACK, 1-bit positive/negative SR and a CSI report for one serving cell.

Frequency Division Duplex & Time Division Duplex

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). In FDD all subframes are available for downlink and uplink transmission; which is known as "Frame Structure Type 1", and the frequency domain is used to separate the inbound and outbound communications, i.e., different carrier frequencies are employed for each link direction. Conversely, TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 2, but only a subset of the subframes of a radio frame are available for downlink transmissions; the remaining subframes are used for uplink transmissions, or for special subframes which contain a guard period to allow for switching between the downlink and uplink transmissions. The guard period further allows the uplink transmission timing to be advanced. This TDD structure is known as "Frame Structure Type 2" in 3GPP LTE Release 8 and later, of which seven different configurations are defined, which allow a variety of downlink-uplink ratios and switching periodicities. FIG. 3 illustrates the table with the 7 different TDD uplink downlink configurations, indexed from 0-6, where "D" means Downlink, "U" means Uplink and "S" means Special. As can be seen therefrom, the seven available TDD uplink-downlink configurations can provide between 40% and 90% of downlink subframes (when counting a special subframe as a downlink subframe, since part of such a subframe is available for downlink transmission).

FIG. 4 shows the frame structure type 2, particularly for a 5 ms switch-point periodicity, i.e., for TDD configurations 0, 1, 2, and 6 and illustrates a radio frame, being 10 ms in length, and the corresponding two half-frames of 5 ms each. The radio frame consists of 10 subframes with 1 ms, where each of the subframes is assigned to be of type uplink, downlink, or special, as defined by the table of FIG. 3.

As can be appreciated from FIG. 3, subframe #1 is always a Special subframe, and subframe #6 is a Special subframe for TDD configurations 0, 1, 2 and 6; for TDD configurations 3, 4, and 5, subframe #6 is destined for downlink. Special subframes include three fields: DwPTS (Downlink Pilot Time Slot), the GP (Guard Period) and of UpPTS (Uplink Pilot Time Slot).

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e., which subframe to monitor for measurement, for CSI measure and report, for time domain filtering to get channel estimation, for PDCCH detection, or for UL/DL ACK/NACK feedback.

Hybrid ARQ (HARQ) Schemes

A common technique for error detection and correction in packet transmission systems over unreliable channels is called hybrid Automatic Repeat request (HARQ). Hybrid ARQ is a combination of Forward Error Correction (FEC) and ARQ.

The feedback provided by the HARQ protocol is either an Acknowledgment (ACK), a negative Acknowledgment (NACK), or a discontinuous transmission (DTX). ACK and NACK are generated depending on whether a transmission could be correctly received or not (i.e., whether decoding was successful). Furthermore, in HARQ operation the eNB can transmit different coded versions from the original transport block in retransmissions so that the UE can employ incremental-redundancy-(IR)-combining to get additional coding gain via the combining gain. However, in realistic systems it is possible that the eNB transmits a transport block to one specific UE on one resource segment, but the UE cannot detect the data transmission due to the DL control information being lost. In this case, IR combining will lead to very poor performance for decoding the transport blocks because the systematic data has not been available at the UE. To mitigate this problem, the UE should feed back a third state, namely discontinuous transmission (DTX) feedback, to indicate that no transport block TB is detected on the associated resource segment (which is different from NACK indicating the decoding failure). To detect the cases of lost DL control information, a Downlink Assignment Index (DAI) was introduced in TDD, as will be explained below.

If a FEC-encoded packet is transmitted and the receiver fails to decode the packet correctly (errors are usually checked by a CRC (Cyclic Redundancy Check)), the receiver requests a retransmission of the packet. Generally (and throughout this document), the transmission of additional information is called "retransmission (of a packet)", although this retransmission does not necessarily mean a transmission of the same encoded information, but could also mean the transmission of any information belonging to the packet (e.g., additional redundancy information) by use of different redundancy versions.

In general, HARQ schemes can be categorized as either synchronous or asynchronous, with the retransmissions in each case being either adaptive or non-adaptive. Synchronous HARQ means that the re-transmissions of HARQ blocks occur at pre-defined (periodic) times relative to the initial transmission. Hence, no explicit signaling is required to indicate to the receiver the retransmission schedule, neither the HARQ process number, as this can be inferred from the transmission timing. In contrast, asynchronous HARQ allows the retransmissions to occur at any time relative to the initial transmission, which offers the flexibility of scheduling retransmissions based on air-interface conditions. In this case, additional explicit signaling is required to indicate e.g., the HARQ process to the receiver, in order to allow for a correct combining and protocol operation. In 3GPP LTE systems, HARQ operations with eight processes are used. The HARQ protocol operation for downlink data transmission will be similar or even identical to HSDPA.

Depending on the information (generally code-bits/symbols) of which the transmission is composed and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, and the receiver stores the information of the (erroneously-decoded) encoded packet as soft information (soft-bits/symbols). This implies that a soft-buffer is required at the receiver. Retransmissions can be composed of identical, partly identical, or non-identical information (code-bits/symbols) of the same packet as earlier transmissions. When receiving a retransmission the receiver combines the stored information from the soft-buffer and the currently-received information and tries to decode the packet based on the combined information. The receiver can also try to decode the transmission individually, however generally performance increases when combining transmissions. The combining of transmissions refers to so-called soft-combining, where multiple received code-bits/symbols are likelihood-combined, and solely received code-bits/symbols are code-combined. Common methods for soft-combining are Maximum Ratio Combining (MRC) of received modulation symbols and log-likelihood-ratio (LLR) combining (LLR combining only works for code-bits).

Type II HARQ schemes are more sophisticated than Type I schemes, since the probability for correct reception of a packet increases with every received retransmission. This increase comes at the cost of a required hybrid ARQ soft-buffer at the receiver. This scheme can be used to perform dynamic link adaptation by controlling the amount of information to be retransmitted. e.g., if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme, each transmission in a Type III scheme must be self-decodable.

In LTE, asynchronous adaptive HARQ is used for the downlink, and synchronous HARQ for the uplink.

In uplink HARQ protocol operation (i.e., for acknowledging uplink data transmissions) there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission, the retransmission will use the same parameters as the previous uplink transmission, i.e., the retransmission will be signaled on the same physical channel resources, respectively uses the same modulation scheme/transport format. Since synchronous adaptive retransmissions are explicitly scheduled via the PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore, the user equipment only needs to check once whether a synchronous non-adaptive retransmission is triggered (i.e., only a NACK is received) or whether eNodeB requests a synchronous adaptive retransmission (i.e., PDCCH is signaled).

HARQ operation is complex and will/cannot be described in full in this application, nor is it necessary for the full understanding of the invention. Part of the HARQ operation is defined e.g., in 3GPP TS 36.213, current version 12.4.0, the relevant passages thereof relating to HARQ being incorporated herein by reference; particularly, clause 7.3 and its subclauses, and clause 10 and its subclauses.

HARQ and Control Signaling for FDD Operation

In case of FDD operation, acknowledgment indicators related to data transmission in a subframe n are transmitted in the opposite direction during subframe n+4, such that a one-to-one synchronous mapping exists between the instant at which the transport is transmitted and its corresponding acknowledgment. In FIG. 5 this HARQ timing relationship is illustrated schematically for a downlink transmission (PDSCH) in subframe 0, where the corresponding HARQ feedback (ACK/NACK) is transmitted 4 subframes after, i.e., in subframe 4. Although not depicted in FIG. 5 to simplify illustration, the same HARQ feedback timing is applicable to other downlink transmissions received at other subframes.

In FDD operation, eight Stop-And-Wait (SAW) HARQ processes are available in both downlink and uplink with a typical Round-Trip Time (RTT) of 8 ms. The HARQ process to which a transport block belongs is identified by a unique three-bit HARQ process IDentifier (HARQ ID).

HARQ and Control Signaling for TDD Operation

In the case of TDD operation, subframes are designated on a cell-specific basis as uplink or downlink or special (see previous chapter), thereby constraining the times at which resource grants, data transmissions, acknowledgments and retransmissions can be sent in their respective directions.

Consequently, the synchronous scheme for FDD cannot be directly reused for TDD operation. The LTE design for TDD therefore supports grouped ACK/NACK transmission to carry multiple acknowledgments within one subframe. The transmission of multiple ACK/NACK messages in UL (or DL) subframes is a unique feature of TDD-LTE as compared with FDD due to the above-mentioned scenario.

For uplink HARQ operation (i.e., for acknowledging uplink data transmissions), the sending (in one downlink subframe) of multiple acknowledgments on the Physical Hybrid ARQ Indicator CHannel (PHICH) is not problematic since, when viewed from the eNodeB, this is not significantly different from the case in which single acknowledgments are sent simultaneously to multiple UEs. However, for downlink HARQ operation (i.e., for acknowledging downlink data transmissions), if the asymmetry is downlink-biased (e.g., TDD UL/DL configurations 3 or 4), the uplink control signaling (PUCCH) formats of FDD are insufficient to carry the additional ACK/NACK information. Each of the TDD subframe configurations in LTE (see FIG. 3) has its own such mapping predefined between downlink and uplink subframes for HARQ purposes, with the mapping being designed to achieve a balance between minimization of acknowledgment delay and an even distribution of ACK/NACKs across the available uplink subframes. This HARQ timing is illustrated in FIG. 6a, which is taken from TS 36.213, Table 10.1.3.1-1 "Downlink association set K: $\{k_0, k_1, \ldots, k_{M-1}\}$ for TDD". FIG. 6a gives the downlink association set index for the ACK/NACK/DTX responses for the subframes of a radio frame, wherein the number in the boxes for the TDD configurations indicates the negative offset of the subframe which HARQ feedback is transported in said subframe. For instance, subframe 9 for TDD configuration 0 transports the HARQ feedback of subframe 9-4=5; subframe 5 of TDD configuration 0 is indeed a downlink subframe (see FIG. 3). For instance, the set K of TDD UL/DL configuration 2 at subframe 2 is 8, 7, 4, and 6, where M=4, and the set K of TDD UL/DL configuration 6 at subframe 3 is 7, where M=1.

FIG. 6b is basically equivalent to Table 10.1.3-1 of TS 36.213 (i.e., FIG. 6a), albeit transformed such that the numbers in the boxes do not indicate an offset, but directly the subframe number, which HARQ feedback is transported in said subframe. For illustration purposes, the subframes 20-29 are considered instead of subframes 0-9. As can be seen, for example subframe 29 of TDD UL/DL configuration 0 carries the ACK/NACK/DTX of subframe 25 (29-4, see also FIG. 6a).

FIG. 7 is an illustration of the HARQ feedback mechanism for TDD operation, exemplarily illustrated for TDD UL/DL configuration 1, where in UL subframes 2 and 7 of a radio frame, the HARQ feedback for those subframes that are 7 and 6 subframes before respective subframes 2 and 7, is grouped and transmitted (see UL subframes 7 and 12 of FIG. 7), and where in UL subframes 3 and 8 the HARQ feedback for that subframe being 4 subframes before the respective subframes 3 and 8, is transmitted (see subframes 8 and 13 of FIG. 7).

Two mechanisms are provided for grouping the acknowledgment information carried in the uplink in TDD operation, termed "ACK/NACK bundling" and "ACK/NACK multiplexing", where selection between these two mechanism can be by higher-layer (RRC) configuration.

ACK/NACK bundling is implemented to reuse where possible the same 1- and 2-bit PUCCH formats (1a and 1b) which are used for FDD. For each downlink codeword (up to two if downlink spatial multiplexing is used), only a single acknowledgment indicator is derived by performing a logical "AND" operation of the acknowledgments across the group of downlink subframes associated with that uplink subframe; this indicates whether zero or more than zero transport blocks in the bundled ACK/NACK group were in error.

For ACK/NACK multiplexing, a separate acknowledgement indicator is returned for each of the group of downlink subframes associated with an uplink subframe. However, to limit the amount of signaling information that this would generate, acknowledgments from multiple codewords on different spatial layers within a subframe are first condensed into a single acknowledgement, again by means of a logical "AND" operation; this is known as "spatial ACK/NACK bundling". For the more extreme asymmetries, however, there remains a need to transmit more than two bits of ACK/NACK information in one uplink subframe. This is achieved using the normal 1- and 2-bit PUCCH formats augmented with a code selection scheme whereby the PUCCH code selected by the UE conveys the surplus information to the eNodeB.

A disadvantage of these lossy compression schemes for grouped acknowledgements is that the eNodeB does not know exactly which transport block(s) failed in decoding. In the event of a NACK, all transport blocks in the same group must be resent, increasing retransmission overheads and reducing link throughput. A more subtle impact is that the average HARQ round trip time (and hence latency) can be increased due to the fact that some blocks cannot be acknowledged until the remainder of the group have been received.

A further complication arises because the PDCCH control signaling is not 100% reliable, and there is some possibility that the UE will miss some downlink resource assignments. This would introduce the possibility of HARQ protocol errors, including the erroneous transmission of ACK in the case when one or more downlink assignments were missed in the group of subframes. In order to help avoid this problem, a "Downlink Assignment Index" (DAI) is included in the PDCCH to communicate to the UE the number of subframes in a group that actually contain a downlink transmission; DAI is described in various passages of TS 36.213, mostly relating to the HARQ operation, e.g., sub-clauses 10, incorporated herein by reference. For TDD UL/DL configurations 1-6, the value of the DAI in DCI format 1/1A/1B/1D/2/2A/2B/2C/2D denotes the accumulative number of PDCCH/EPDCCH (s) with assigned PDSCH transmission(s) and PDCCH/EPDCCH indicating downlink SPS release up to the present subframe within subframe(s) n-k of each configured serving cell, where k∈K, and shall be updated from subframe to subframe. UE calculates the number of PDCCH/EPDCCH (s) with assigned PDSCH transmission(s) and PDCCH/EPDCCH indicating downlink SPS release and compares it with DAI. If these two numbers are not equal, at least one PDCCH has been missed.

In the case of ACK/NACK bundling, this helps the UE to detect missed downlink assignments and avoid returning ACK/NACK if one or more downlink assignments were missed, while in the case of ACK/NACK multiplexing the DAI helps the UE to determine how many bits of ACK/NACK information should be returned.

FIG. 8 illustrates for the same TDD configuration 1 as exemplarily used already in FIG. 7, the grouping of HARQ feedback by means of HARQ multiplexing, while FIG. 9 illustrates the grouping of HARQ feedback by means of HARQ bundling.

Detailed information on ACK/NACK bundling and multiplexing is provided in the corresponding Technical Standard in subclause 10.1.3 "TDD HARQ-ACK feedback procedure" of TS 36.213, current version 12.4.0, incorporated herein by reference. A brief summary is provided in the following.

TDD ACK/NACK bundling is performed per codeword across M multiple DL subframes associated with a single UL subframe n, where M is the number of elements in the set K defined in the table of FIG. 6a, by a logical AND operation of all the individual PDSCH transmission (with and without corresponding PDCCH) ACK/NACKs and ACK in response to PDCCH indicating downlink SPS release. The bundled 1 or 2 ACK/NACK bits are transmitted using PUCCH format 1a or PUCCH format 1b, respectively.

For TDD ACK/NACK multiplexing and a subframe n with M>1, spatial ACK/NACK bundling across multiple codewords within a DL subframe is performed by a logical AND operation of all the corresponding individual ACK/NACKs, and PUCCH format 1b with channel selection is used.

For TDD ACK/NACK multiplexing and a subframe n with M=1, spatial ACK/NACK bundling across multiple codewords within a DL subframe is not performed, and 1 or 2 ACK/NACK bits are transmitted using PUCCH format 1a or PUCCH format 1b, respectively.

For FDD, the PUCCH resource used to transmit HARQ-ACK is determined by the first CCE used for transmission of corresponding PDCCH. If there is no corresponding PDCCH, the PUCCH resource is determined by higher layer configuration.

For TDD ACK/NACK bundling or TDD ACK/NACK multiplexing and a subframe n with M=1, the PUCCH resource for HARQ-ACK transmission is determined by the first CCE used for transmission of corresponding PDCCH in the latest subframe. If there is no corresponding PDCCH, the PUCCH resource is determined by higher-layer configuration.

For TDD ACK/NACK multiplexing and sub-frame n with M>1, the PUCCH resources $n_{PUCCH,i}^{(1)}$ for HARQ-ACK transmission are determined by the first CCEs used for transmission of corresponding PDCCH in subframe n-k, where $k_i \in K$ (defined in FIG. 6a) and $0 \le i \le M-1$. If there is no corresponding PDCCH, the PUCCH resources are determined by higher layer configuration.

The UE shall transmit b(0), b(1) on an ACK/NACK resource $n_{PUCCH,i}^{(1)}$ in sub-frame n using PUCCH format 1b. The value of b(0), b(1) and the ACK/NACK resource $n_{PUCCH,i}^{(1)}$ are generated by channel selection according to tables in TS 36.213 section 10. In case b(0), b(1) are mapped to "N/A", then, the UE shall not transmit ACK/NACK response in subframe n.

HARQ Support for Carrier Aggregation

In 3GPP Release 10, introducing carrier aggregation, an even larger number of ACK/NACK bits need to be transmitted in a single subframe. To said end, new PUCCH mechanisms are provided as will be explained in the following. For carrier aggregation, the uplink control signaling (e.g., HARQ ACK/NACK signaling, scheduling requests (SR) and Channel State Information (CSI)) has to support up to five downlink carriers. A UE may have to send a HARQ ACK/NACK for every downlink transport block, i.e., up to ten per subframe in the case of downlink spatial multiplexing with five downlink CCs.

In LTE-A all PUCCH control signaling is transmitted on the uplink PCC of the PCell. Thus, PUCCH is never transmitted on more than one uplink CC. As will be explained later, this may change in later releases, where PUCCH may also be transmitted in SCell(s).

In order to provide HARQ feedback for PDSCH transmissions on multiple CCs, new multi-bit ACK/NACK PUCCH formats are defined as of Release 10, namely PUCCH format 3 (for up to 10-bit HARQ-ACK for FDD and for up to 20-bit HARQ-ACK for TDD), PUCCH format 3 (for up to 11 bits corresponding to 10-bit HARQ-ACK and 1-bit positive/negative SR for FDD and for up to 21 bits corresponding to 20-bit HARQ-ACK and 1-bit positive/negative SR), and PUCCH format 1b (for up to 4-bit HARQ-ACK with channel selection when the UE is configured with more than one serving cell), as already mentioned in the corresponding previous section on PUCCH formats.

For UEs that support no more than four ACK/NACK bits and are configured with up to two CCs, PUCCH format 1b with channel selection is used. For UEs that support more than four ACK/NACK bits, both PUCCH format 1 with channel selection and format 3 are supported (where PUCCH format 1b with channel selection can be used for up to four ACK/NACK bits and two configured CCs and format 3 for the full range of ACK/NACK bits).

PUCCH Format 3

PUCCH format 3 is designed to convey large ACK/NACK payloads, and supports 48 coded bits. The actual number of bits of ACK/NACK feedback is determined from the number of configured CCs, the configured transmission modes on each of them, and, in TDD, the ACK/NACK bundling window size (M, the number of downlink subframes associated with a single uplink subframe, see FIG. 6a). For FDD, a maximum payload of 10 ACK/NACK bits is supported, covering up to five CCs configured for MIMO transmission (i.e., two ACK/NACK bits per CC). For TDD, PUCCH format 3 supports an ACK/NACK payload size of up to 20 bits; if the number of ACK/NACK bits to be fed back for multiple downlink subframes associated with a single uplink subframe is greater than 20, "spatial bundling" (i.e., a logical AND) of the ACK/NACK bits corresponding to the two codewords within a downlink subframe is performed for each of the serving cells. The maximum payload size carried by PUCCH format 3 in Release 10 is 21 bits, corresponding to 20 bits of ACK/NACK information and one bit for SR appended at the end of the ACK/NACK bits. The ACK/NACK bits are concatenated in ascending order of the downlink CC index.

PUCCH Format 1b with Channel Selection

PUCCH format 1b with channel selection involves configuring up to four PUCCH format 1b resources ("channels"); the selection of one of these resources indicates some of the ACK/NACK information to be conveyed. For FDD, the use of PUCCH format 1b with channel selection to convey the ACK/NACK information for two CCs is straightforward. For TDD, it is necessary to use spatial bundling of ACK/NACK bits across two codewords within a downlink subframe for each of the serving cells if the number of ACK/NACK bits to be fed back is greater than four. If the number of ACK/NACK bits after performing spatial bundling is still larger than four, time-domain bundling is performed in addition.

Mapping tables are specified for the cases of two, three or four ACK/NACK bits to define the mapping of ACK/NACK combinations to the configured PUCCH resources. These tables are designed to support fully implicit resource indication, fallback to Release-8 operation in the case of a single configured CC, and equalization of the performance of individual ACK/NACK bits. Separate mapping tables are defined depending on whether or not time-domain bundling of the ACK/NACK feedback is performed.

When taking the perspective of FDD vis-à-vis TDD the use of PUCCH format 1b with channel selection and format 3 can be summarized as follows. In case of FDD, when the UE is configured with two serving cells, UE can transmit ACK/NACK on PUCCH format 1b with channel selection or PUCCH format 3 depending on higher layer configuration. When UE is configured with more than two serving cells, UE transmits ACK/NACK with PUCCH format 3. Both PUCCH format 1b with channel selection and PUCCH format 3 can be transmitted on two antenna ports (p0, p1).

FDD & PUCCH Format 1b with Channel Selection

When UE is configured with two serving cells and PUCCH format 1b with channel selection, the ACK/NACKs from up to two serving cells are transmitted on up to 4 PUCCH resources. PUCCH resources on antenna port p0 on primary cell are determined by the first CCE of corresponding PDCCH transmission. PUCCH resources on antenna port p1 on secondary cell are selected from higher layer configured PUCCH resources by TPC command in DCI information. PUCCH resources on antenna port p1 are configured by higher-layer signaling. The mapping of transport blocks and serving cell to HARQ-ACK and the number of PUCCH resources are shown in TS 36.213, version 12.1.0 Table 10.1.2.2.1-1, incorporated herein by reference. Transmission of PUCCH format 1b with different number of PUCCH resources are shown in TS 36.213 version 12.1.0 Table 10.1.2.2.1-3, 10.1.2.2.1-4, and 10.1.2.2.1-5 incorporated herein by reference.

FDD & PUCCH Format 3

When the UE is configured with PUCCH format 3, if there is only PDSCH transmitted on primary cell, the ACK/NACK will be transmitted on PUCCH format 1a/1b; if there are PDSCH transmitted on secondary cell, the ACK/NACKs are transmitted on PUCCH format 3. For FDD with PUCCH format 3, spatial bundling across multiple codewords is not used.

In case of TDD, the TDD HARQ-ACK feedback procedures for more than one configured serving cell are either based on a PUCCH format 1b with channel selection HARQ-ACK or a PUCCH format 3 HARQ-ACK procedure. Both PUCCH format 1b with channel selection and PUCCH format 3 can be transmitted on two antenna ports (p0, p1).

If UE is configured with more than one serving cell and the TDD configuration of serving cells are the same, ACK/NACKs of TDD configuration 5 can only be transmitted on PUCCH format 3 with up to two serving cells. If UE is configured with more than one serving cell and one of the TDD configuration of serving cells is TDD configuration 5, only PUCCH format 3 is supported to transmit ACK/NACKs.

TDD & PUCCH Format 1b with Channel Selection

PUCCH format 1b with channel selection is only supported when UE is configured with two serving cells. $M_{primary}$ is the number of DL subframes whose ACK/NACKs are transmitted on one UL subframe on primary cell. $M_{secondary}$ is the number of DL subframes whose ACK/NACKs are transmitted on one UL subframe on secondary cell. If the TDD configuration of serving cells are different, M is $\max(M_{primary}, M_{secondary})$. If the TDD configuration of serving cells are the same $M=M_{primary}$.

When M=1, the ACK/NACKs of the two serving cells are transmitted using the same method as FDD with PUCCH format 1b with channel selection. Up to four HARQ-ACKs can be transmitted on up to four PUCCH resources.

When M>1, spatial HARQ-ACK bundling across multiple codewords within a DL subframe is performed by a logical "AND" operation of all the corresponding individual HARQ-ACKs. When M=2, up to four HARQ-ACKs from two serving cells are transmitted on up to four PUCCH resources using TS 36.213 version 12.1.0 Table 10.1.3.2-1, Table 10.1.3.2-2, Table 10.1.3.2-3, incorporated herein by reference. When M>2, HARQ-ACKs from two serving cells are transmitted using TS 36.213 version 12.1.0 Table 10.1.3.2-5, Table 10.1.3.2-6, incorporated herein by reference.

FIG. 10 exemplarily illustrates HARQ operation in case of two component carriers, both with TDD configuration 1. In order to simplify illustration, HARQ feedback is only depicted for UL subframe 7, which groups (in this cases multiplexes) respectively HARQ feedback for downlink transmissions from two subframes (0, and 1) for both carriers. For the transmission via PCell, the PUCCH format 1b with channel selection is used.

Although in the example of FIG. 10 the same UL/DL configurations are assumed for both component carriers, HARQ feedback can also be provided when different UL/DL configurations are used. Respective information is available from 3GPP TS 36.213, version 12.4.0, subclause 10.2 incorporated herein by reference.

TDD & PUCCH Format 3

For TDD with PUCCH format 3, if there are more than 20 HARQ-ACK bits for M multiple DL subframes associated with a single UL subframe, spatial HARQ-ACK bundling across multiple codewords within a DL subframe is performed for each serving cell by a logical AND operation of all of the corresponding individual HARQ-ACKs. For TDD with PUCCH format 3, if there are up to 20 HARQ-ACK bits for M multiple DL subframes associated with a single UL subframe, spatial HARQ-ACK bundling across multiple codewords within a DL subframe is not performed for each serving cell.

FIG. 11 exemplarily illustrates the HARQ operation in case of three component carriers, all three being operated with TDD configuration 1. In order to simplify illustration, HARQ feedback is only depicted for UL subframe 7, which groups respectively HARQ feedback for downlink transmissions from two subframes (0, and 1) for all three carriers. For the transmission via the PCell, PUCCH format 3 is used.

Uplink Control Information can also be transmitted on the PUSCH. If a UE is configured with multiple serving cells and simultaneous PUCCH and PUSCH is not enabled, and there is at least one PUSCH transmission, all UCI can be multiplexed onto a PUSCH. The ACK/NACK payload size for transmission on the PUSCH is determined from the number of configured downlink CCs, the configured transmission mode for each downlink CC, and, in the case of TDD, the bundling window size and signaled DAI value in the UL grant.

In FIGS. 10 and 11, where HARQ feedback in case of TDD with carrier aggregation was discussed, it was assumed that the various cells operate with the same TDD UL/DL configurations (TDD UL/DL configuration 1, in these cases). However, the currently-standardized HARQ operation which supports up to 5 carriers already allows that the various cells are operated with different TDD UL/DL configurations. To said end, for each SCell operating with a TDD UL/DL configuration which is different from the one which is operated by the cell used for transmitting the HARQ feedback (e.g., the PCell), an appropriate one of the various HARQ feedback timings of the table of FIG. 6a, 6b is selected, according to which the HARQ feedback is performed for said SCell. As will become apparent from the following discussion, and the examples in FIGS. 12 and 13, the HARQ feedback timing to be followed by the SCell need not be the one as would be normally associated to the TDD UL/DL configuration with which the SCell is actually operated.

3GPP TS 36.213, current version 12.4.0, subclause 10.2, incorporated herein by reference, explains that a DL-reference UL/DL configuration is selected, based on the Table 10.2-1 depending on the first cell's and the second cell's TDD UL/DL configurations. For example, in FIG. 12 it is assumed that the PCell is using TDD UL/DL configuration 1, while the SCell 1 is operating with TDD UL/DL configuration 0. In this particular case, the downlink subframes of the PCell (i.e., 0, 4, 5, 9) is a superset of the downlink subframes of the second cell (0, 5). Thus, even though the SCell 1 is using TDD UL/DL configuration 0 for its communication, the HARQ feedback for the SCell 1 is performed by use of the timing as actually defined for TDD UL/DL configuration 1 (also used by PCell) (see lower part of FIG. 12); the TDD UL/DL configuration 1 is the DL-reference UL/DL configuration (see Set 1 of Table 10.2-1 of TS 36.213). In FIG. 12 for the HARQ feedback table for SCell 1, those subframes as defined for TDD UL/DL configuration 1 which are then actually used for providing HARQ feedback for the SCell 1 are in bold. Conversely, for the HARQ feedback table for SCell1, those subframes as defined for TDD UL/DL configuration 1, for which there is no corresponding downlink subframe for SCell 1, are crossed out (i.e., HARQ feedback for uplink subframes 19 and 24 of Cell 1); for these (crossed-out) subframes a DTX will be transmitted.

Another example for HARQ feedback in TDD carrier aggregation of two cells with different TDD UL/DL configurations is given in FIG. 13, where it is assumed that the PCell is using TDD UL/DL configuration 1, while SCell 1 is using TDD UL/DL configuration 3. Following the standard procedure, the DL-reference UL/DL configuration for the SCell 1 is determined to be TDD UL/DL configuration 4 (see Set 3 of Table 10.2-1 of TS 36.213). FIG. 13 illustrates how this DL-reference configuration is applied for the HARQ feedback for SCell 1. As already explained for FIG. 12, subframes that are actually used are bolded, whereas subframes, for which there is no corresponding downlink subframe for Scent are crossed out (i.e., HARQ feedback for uplink subframe 14, for which a DTX will be transmitted).

Although in the above-discussed examples of FIGS. 12 and 13, only two cells are considered, the same concept is applicable to carrier aggregations with more cells, where for each additional cell an appropriate TDD UL/DL configuration (or DL-reference UL/DL configuration) is determined according to which the HARQ feedback timing is then determined.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 14, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed during RAN1#78bis that the LAA investigation at 3GPP will focus on unlicensed bands at 5 GHz, although no final decision has been taken. One of the most critical issues is therefore the coexistence with Wi-Fi (IEEE 802.11) systems operating at these unlicensed bands. In order to support fair coexistence between LTE and other technologies such as Wi-Fi as well to guarantee fairness between different LTE operators in the same unlicensed band, the channel access of LTE for unlicensed bands has to abide by certain sets of regulatory rules which depend on region and particular frequency band; a comprehensive description of the regulatory requirements for operation on unlicensed bands at 5 GHz is given in R1-144348, "Regulatory Requirements for Unlicensed Spectrum", Alcatel-Lucent et al., RAN1#78bis, October 2014 incorporated herein by reference. Depending on region and band, regulatory requirements that have to be taken into account when designing LAA procedures comprise Dynamic Frequency Selection (DFS), Transmit Power Control (TPC), Listen-Before-Talk (LBT) and discontinuous transmission with limited maximum transmission duration. The intention of 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5 GHz is in most regions limited to rather low transmit power levels compared to the operation on licensed bands resulting in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based e.g., on energy detection. The equipment has to observe the channel for a certain minimum time during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

LTE Carrier Aggregation Enhancement Beyond 5 Carriers

LAA (Licensed-Assisted Access) has created a lot of interest in extending the LTE carrier aggregation feature towards capturing the spectrum opportunities of unlicensed spectrum in the 5 GHz band. WLAN operating in the 5 GHz band nowadays already supports 80 MHz in the field, and 160 MHz is to follow in the Wave 2 deployment of IEEE 802.11ac. There are also other frequency bands, such as 3.5 GHz, where aggregation of more than one carrier on the same band is possible, in addition to the bands already widely in use for LTE.

Enabling the utilization of at least similar bandwidths for LTE in combination with LAA as IEEE 802.11ac Wave 2 will support calls for extending the carrier aggregation framework to support more than 5 (at least DL) carriers. The extension of the CA framework beyond 5 carriers would give operators an opportunity to more efficiently utilize the available spectrum for communication needs.

As has been recognized already, not all the CA aspects scale directly with an increasing number of component carriers. As an example, if the number of CA-capable UEs and/or the aggregated CCs is increased, the cell used as the PCell will be highly loaded. This is because there are key features which are applied to the PCell only, e.g., the PUCCH transmissions. The increase in the number of supported component carriers calls for a rather large increase in the required PUCCH payload size per CA UE, which creates an even more severe impact on PCell UL load with increasing number of CA UEs. Accommodating all the PUCCH transmissions in the PCell logically impacts performance, especially for the non-CA UEs.

In this case, the PCell change between the macro cell and a small cell served by an RRH can distribute the PUCCH resources of UEs in the network and hence can resolve the overload issue. However, this eliminates the benefit of installing small cell equipment, like RRH, in a simple manner.

Work is conducted to support PUCCH on SCell for Carrier Aggregation and to enhance the carrier aggregation capabilities up to 32 component carriers. As defined in RP-142286, "New WI proposal: LTE Carrier Aggregation Enhancement Beyond 5 Carriers", the detailed objectives of the corresponding work item are:

1. For Rel-12 CA configurations, specify and complete the support of PUCCH on SCell for UEs supporting uplink Carrier Aggregation.

Develop the physical layer specifications for PUCCH on SCell based on the UCI mechanism for Dual Connectivity (i.e., PUCCH is configured simultaneously on PCell and one SCell) and based on the UCI signaling formats on PUCCH defined for Rel-12 CA configurations [RAN1 until RAN #68].

Identify and specify required L2/L3 functions and procedures to support PUCCH on SCell for the UE [RAN2].

2. Specify necessary mechanisms to enable the LTE carrier aggregation of up to 32 component carriers for the DL and UL, including:

Enhancements to DL control signaling for up to 32 component carriers including both self-scheduling and cross-carrier scheduling, if any [RAN]

Enhancements to UL control signaling for up to 32 component carriers [RAN1]

Enhancements to support UCI feedback on PUCCH for up to 32 DL carriers

Specify the necessary enhancements to UCI signaling formats to support UCI feedback for up to 32 DL carriers Enhancements to support UCI feedback on PUSCH for up to 32 DL carriers Higher layer enhancements for a UE to aggregate up to 32 component carriers, if identified [RAN2]

3. Specify the necessary (if any) eNB and UE core requirements [RAN4]

No band-specific RAN4 work is planned as part of this work item.

PUCCH Groups

In Rel-12, Dual Connectivity (DC) was developed, in which the UE is required to be capable of UL-CA with simultaneous PUCCH/PUCCH and PUCCH/PUSCH transmissions across cell-groups (CGs). Under the WI on Rel-12 DC, the PUCCH on the SCell for CA was supposed to be introduced by reusing the PUCCH mechanism for DC as much as possible. Nevertheless, it was dropped from the WI objective due to the tight schedule in Rel-12.

As such, support of PUCCH on SCell for CA is deemed as essential for the deployment scenario #4. From physical layer viewpoints, it is possible to reuse dual connectivity UCI feedback mechanism for CA largely as initially planned in the Rel-12 DC WI. Moreover, PUCCH on SCell for CA can ease the burden in terms of PUCCH considering an increase in the number of DL carriers that can be aggregated.

Despite of introduction of PUCCH on SCell or Dual PUCCH, CA extension to support up to 32 component carriers calls also for enhancements on HARQ-ACK feedback and CSI feedback carried on single UL carrier. Such enhancements can also improve CA operation with TDD PCell, which faces limitations on PDSCH HARQ-ACK feedback already with 3 component carriers.

In RAN1#80, under the WI "LTE Carrier Aggregation Enhancement Beyond 5 Carriers" discussion, also taken from RP-142286, "New WI proposal: LTE Carrier Aggregation Enhancement Beyond 5 Carriers", following agreements were reached:

> For Rel.12 CA configurations, set the agreements for PUCCH on SCell achieved during the Rel.12 DC WI as the baseline
>> PUCCH transmission on 2 serving cells is realized by the following methods:
>>> On the PCell for SCells in PUCCH cell group 1
>>> On one SCell configured by higher-layer signaling to carry PUCCH for SCells in PUCCH cell group 2
>>> One SCell can only belong to one PUCCH cell group
>>> One of the two serving cells is PCell
>>> FFS: No cross-carrier scheduling between cells in different PUCCH cell groups
>>> PUCCH on SCell can carry HARQ-ACK and CSI
>> PUCCH on SCell-only (i.e., no PUCCH on PCell) is not supported in Rel.13

Two PUCCH cell groups are currently supported, where the PCell is defined to be used for PUCCH transmission for PUCCH cell group 1. For PUCCH cell group 2, one SCell is configured to be used for the PUCCH transmission. Then, the various cells are then assigned to the PUCCH cell group 1 and 2, such that the PUCCH for a particular cell is transmitted via that cell which is defined to be used for PUCCH transmission for the respective PUCCH the group to which the particular cell belongs.

BRIEF SUMMARY

One non-limiting and exemplary embodiment provides an improved method for providing feedback information of a retransmission protocol to a radio base station.

The independent claims provide non-limiting and exemplary embodiments. Advantageous embodiments are subject to the dependent claims.

According to a first aspect, the invention improves how to provide feedback information when operating a retransmission protocol for receiving downlink transmissions from the radio base station. The aspect is also applicable for scenarios where a user equipment is configured with a large number of component carriers (cells). It is assumed that the user equipment is in communication with the radio base station, thus continuously receiving downlink transmissions via some or all of the configured cells. It is further assumed that the UE is also configured to operate a retransmission protocol with respect to the downlink communication with the radio base station, according to which feedback information on the downlink communication is to be transmitted to the radio base station.

According to the first aspect, at least one cell bundling group is defined for the user equipment, the cell bundling group grouping at least two of the cells together for providing the feedback information as will be explained in the following. The cell bundling group(s) can be defined for example by the radio base station and communicated to the UE by using higher layer signaling. For example, one of the cell bundling groups may group all carriers of a particular type, such as the unlicensed carriers. In this case, the remaining carriers, for example the licensed carriers, may or may not be grouped within one or more cell bundling groups.

The cell bundling group(s) is defined for the purpose of grouping feedback information generated by the user equipment. In particular, the feedback information generated for those cells of a particular cell bundling group are bundled so as to generate bundled feedback information per cell bundling group which is/are then transmitted to the radio base station.

The actual bundling of the feedback information can be performed in different ways. For example when considering a frequency division duplex system (where feedback is transmitted in a synchronous fashion, i.e., a predetermined amount of time after receiving the corresponding downlink transmission), for each subframe, feedback information in respect to only one previous subframe is pending per cell. The bundling of the feedback information for each cell bundling group is performed per subframe, so as to bundle that feedback information having been generated for those cells that are associated with the respective cell bundling group (i.e., across the cells of the cell bundling group). As a result, a bundled feedback information is generated per subframe and per cell bundling group, this information being provided to the radio base station.

On the other hand, when considering a time division duplex system (where feedback is transmitted asynchronously, according to predetermined feedback timings), for each subframe, feedback information in respect to multiple previous subframes may be pending per cell. In consequence, the first aspect provides two different bundling techniques for the feedback operation in TDD systems. According to the first bundling technique, which is somewhat similar to the bundling technique employed for FDD systems, a cross carrier bundling concept is applied. In more detail, it should be noted that for a particular uplink subframe several items of the feedback information may be pending to be transmitted to the radio base station, wherein each item of feedback information refers to one of the previous (downlink) subframes according to the above-mentioned predetermined feedback timing being employed for the respective uplink subframe. The different items of feedback information, relating to those cells being associated with the currently processed cell bundling group, are bundled in a successive order of the feedback information items, such that a bundled feedback information is generated per feedback information item order. In other words, the bundling is performed so as to bundle the feedback information of the same order across the several cells being associated to the same cell bundling group. For each uplink subframe, this is performed successively for each order of the feedback information items that are pending for being transmitted to the radio base station, and for each cell bundling group. As a result, for each uplink subframe, and for each cell bundling group, the first bundling technique generates bundled feedback information per order of the feedback information items pending to being transmitted.

According to the second bundling technique that can be applied to TDD systems, the different items of feedback information, relating to those cells that are associated with the currently processed cell bundling group, are bundled within each cell such that feedback information items of the same cell are bundled. As a result, for each uplink subframe, and for each cell bundling group, the second bundling technique generates bundled feedback information per cell. According to one exemplary implementation of the second bundling technique, the per-cell-bundled feedback information is concatenated within each cell bundling group and in an increasing order of the index of the respective cell.

In any case, one or more items of bundled feedback information are generated for each cell bundling group (provided that at least one downlink transmission was received for a cell of the cell bundling group), which are then transmitted to the radio base station. The transmission of the bundled feedback information for the different cell bundling groups is performed together in an appropriate uplink control information format via the respective uplink subframe. The appropriate uplink control information format is selected among a plurality of available formats, where in general a cell bundling group is assumed to be a cell such that the bundled feedback information of one cell bundling group is assumed to be the feedback information of one cell. The selection of the appropriate uplink control information format depends for example on the number of cell bundling groups, and/or on the number of feedback information items that are pending to be transmitted per uplink subframe.

One advantage of the above-described first aspect is that the amount of data to be transmitted for the feedback information can be reduced by appropriately bundling the feedback information. This is particularly important in case a large number of cells are configured for a UE that is furthermore limited in its uplink power. Another benefit is that by implementing cell bundling groups, the radio base station can control the bundling which can be made dependent on the particular UE, for example on the uplink power limitation of the UE.

Correspondingly, in one general first aspect, the techniques disclosed here feature a method for providing, by a user equipment, feedback information of a retransmission protocol to a radio base station in a mobile communication system. The user equipment is configured with at least two cells. At least one cell bundling group is defined for the user equipment such that one of the at least one cell bundling group is associated with at least two out of the at least two cells. The user equipment is in communication with the radio base station to receive downlink transmissions via at least one of the at least two cells. The user equipment is configured to operate a retransmission protocol with the radio base station comprising the step of providing feedback information for the downlink communication via the at least two cells to the radio base station. For each cell bundling group, the UE is configured to bundle feedback information generated in connection with those cells being associated with the respective cell bundling group so as to generate bundled feedback information per cell bundling group. Then, the UE transmits the bundled feedback information of each cell bundling group to the radio base station.

Correspondingly, in one general first aspect, the techniques disclosed here feature a user equipment which provides feedback information of a retransmission protocol to a radio base station in a mobile communication system. The UE is configured with at least two cells, and at least one cell bundling group is defined for the user equipment such that one of the at least one cell bundling group is associated with at least two out of the at least two cells. The user equipment is in communication with the radio base station to receive downlink transmissions via at least one of the at least two cells, is configured to operate a retransmission protocol with the radio base station comprising the step of providing feedback information for the downlink communication via the at least two cells to the radio base station. A processor of the UE bundles, for each cell bundling group, feedback information generated in connection with those cells being associated with the respective cell bundling group so as to generate bundled feedback information per cell bundling group. A transmitter transmits the bundled feedback information of each cell bundling group to the radio base station.

Correspondingly, in one general first aspect, the techniques disclosed here feature a radio base station for receiving, from a user equipment, feedback information of a retransmission protocol. The user equipment is configured with at least two cells, and at least one cell bundling group is defined for the user equipment such that one of the at least one cell bundling group is associated with at least two out of the at least two cells. The user equipment is in communication with the radio base station to receive downlink transmissions via at least one of the at least two cells. The radio base station is configured to operate a retransmission protocol with the user equipment comprising the step of receiving feedback information for the downlink communication via the at least two cells from the user equipment. A receiver of the radio base station receives bundled feedback information of each cell bundling group from the user equipment. The bundled feedback information is generated by the user equipment by bundling, for each cell bundling group, feedback information generated in connection with those cells being associated with the respective cell bundling group so as to generate bundled feedback information per cell bundling group.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE DRAWINGS

In the following exemplary embodiments are described in more detail with reference to the attached figures and drawings.

FIG. 3 shows the seven currently-standardized TDD UL/DL configurations 0-6, the respective definitions of the 10 subframes and their switch-point periodicity FIG. 4 illustrates the structure of a radio frame, being composed of two half-frames and 10 subframes, for a 5 ms switch-point periodicity.

DETAILED DESCRIPTION

Figure 1:
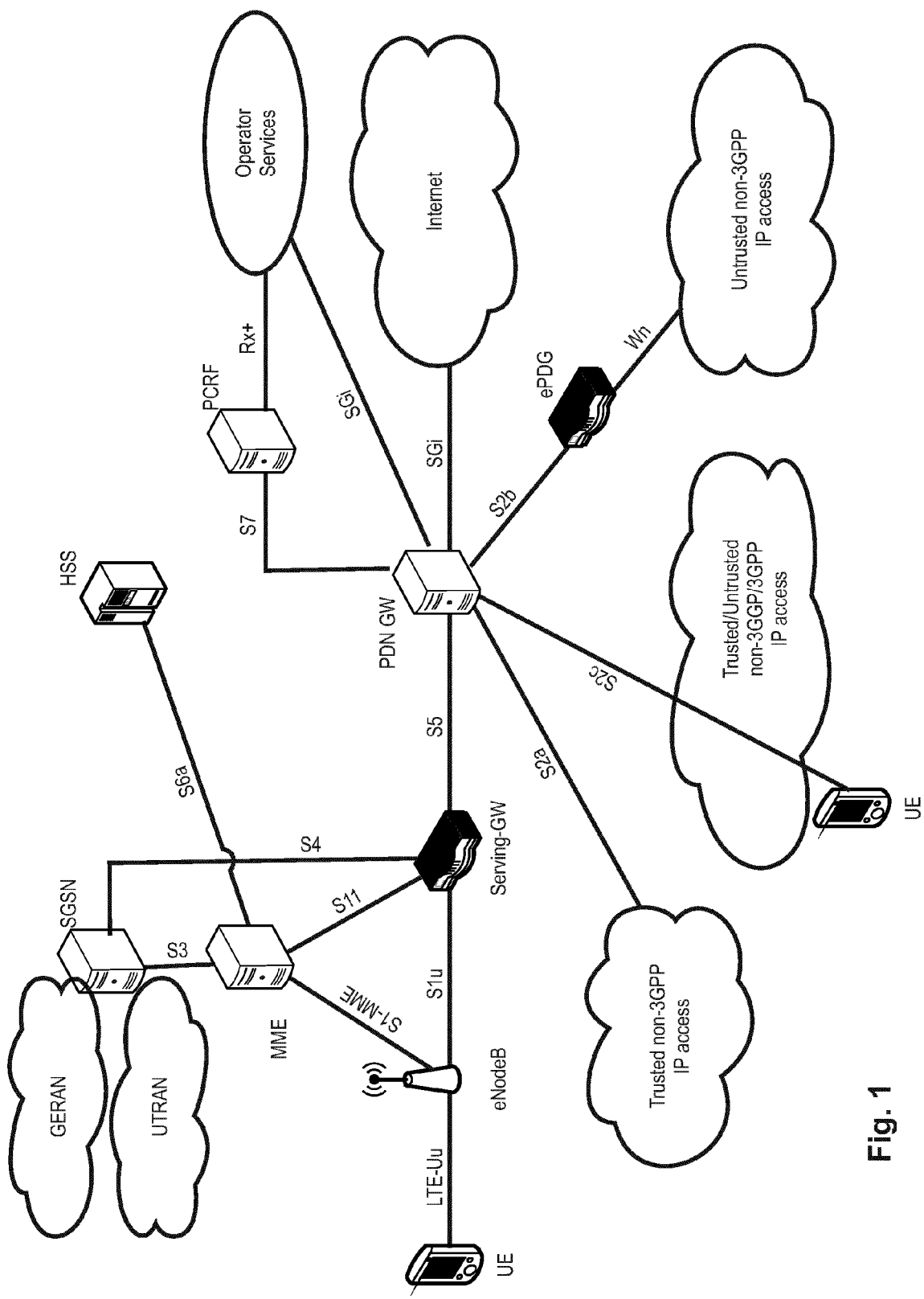
FIG. 1 shows an exemplary architecture of a 3GPP LTE system.
Figure 2:
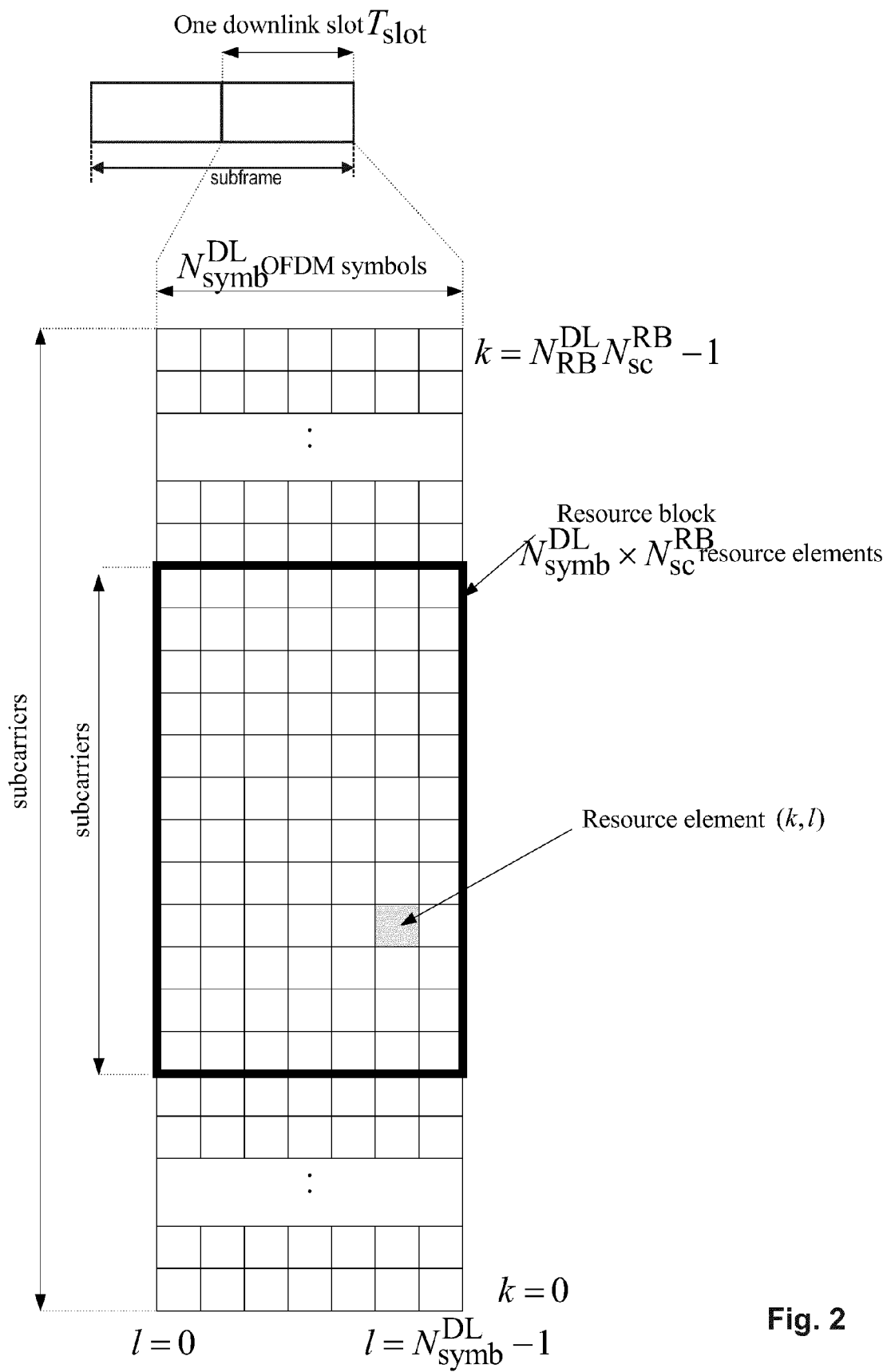
FIG. 2 shows an exemplary downlink resource grid of a downlink slot of a subframe as defined for 3GPP LTE (Release 8/9)

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

As has been explained in the background section, future 3GPP releases will support the configuration of more than 5 carriers, particularly up to 32 carriers. To said end, new PUCCH procedures will be necessary to cope with the increased uplink feedback generated in connection with the increased number of carriers. The design targets would be to reduce the PUCCH overhead, particularly for UL-power-limited UEs.

The following exemplary embodiments are conceived by the inventors to mitigate the problems explained above.

Some of these are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the invention and its embodiments as such.

According to some exemplary embodiments, the concept of the PUCCH cell groups is expanded so as to deal with an increased number of component carriers for which HARQ feedback is to be provided. In particular, multiple PUCCH cell groups (i.e., more than that the two currently supported) may be defined. In said respect it should be noted that PUCCH for a maximum of 5 serving cells can be transmitted in one PUCCH group, such that 7 PUCCH cell groups are defined so as to be able to support the 32 carriers envisaged by the work item. Although this embodiment is already advantageous since it is able to cope with an increased number of carriers, in the following several additional exemplary embodiments will be explained that are based on a different concept.

As explained in the background section, HARQ is employed between a UE and the eNB to increase reliability of the communication. Correspondingly, it is assumed for the exemplary embodiments explained in the following that the retransmission protocol, HARQ, is used for (at least) downlink communications between the UE and the eNB, such that the UE will provide feedback information (HARQ feedback) to the eNB with regard to downlink data (i.e., PDCCH; PDSCH). The timing for providing the HARQ feedback to the eNB is defined by the HARQ protocol; e.g., in FDD, with a 4 ms offset, or in TDD, based on the HARQ timing table(s). In general, the timing as presented in detail in the background section in connection with FIG. 5, 6a, 6b, and FIG. 7-13, for FDD and TDD, may be reused for the exemplary embodiment. In other words, the exemplary embodiment does not need to change the timing of HARQ feedback as currently being standardized (or as standardized in the future), but rather focuses on the subsequent processing of the HARQ feedback generated according to said timing. This will become more apparent with the following explanations of the particular examples chosen to illustrate the concepts of the embodiments.

In the following, a scenario is considered where the UE is configured with carrier aggregation with various cells. The exemplary embodiments become especially advantageous with an increasing number of cells configured for the carrier aggregation, and are thus to be considered particularly important for scenarios where there are more than 5 carriers (see new work item discussed in the background section). Nevertheless, the exemplary embodiments are not restricted to such a scenario, and can also be applied already for carrier aggregation with only 2 cells.

A further assumption to simplify illustration is that only single codewords are transmitted, i.e., spatial multiplexing is not used. The invention is also applicable when two codewords are transmitted as will be explained later.

In addition to the usual HARQ configuration as explained in the background section, the exemplary embodiments introduce (different) cell bundling groups so as to group the HARQ feedback of different cells. In more detail, at least one cell bundling group is defined per UE, so as to group two or more cells that are configured for the respective UE. Which cells form one cell bundling group can e.g., be determined by the eNB, which then can correspondingly configure the respective UEs (e.g., appropriately using higher-layer signaling).

One option how to group the various cells of a UE could be that all cells of a particular type are grouped within one cell bundling group. For example, all unlicensed cells could form one group, whereas the remaining licensed cell may also be grouped within one or more a cell bundling groups (alternative, the remaining licensed cells may not be grouped at all in a cell bundling group).

The number of cell bundling groups and/or the grouping of cells performed by the eNodeB can also depend on the capabilities/current uplink condition of the UE. For instance, for a UE which is currently uplink power limited (i.e., which cannot transmit too many PUCCH to the eNodeB and/or only few bits per PUCCH), less cell bundling groups will be defined in the first place, and/or each cell bundling group being associated with a larger number of cells such that the PUCCH load is reduced.

The cell bundling groups may be also reconfigured by the eNodeB if necessary, for example if the uplink conditions of the UE change significantly.

In any case, it is assumed in the following that one or more a cell bundling groups are defined for the UE, where each cell bundling group at least associates two cells together. It should be noted that one particular cell shall only be associated with one cell bundling group. However, not every cell need to be associated with a cell bundling group, although for the exemplary embodiments to be applied, at least one cell bundling group with at least 2 cells need to be defined.

In the following, an exemplary embodiment to be implemented in scenarios which employ FDD shall be explained in connection with FIG. 15. For this scenario used in FIG. 15, and also for the remaining figures, it is assumed that two cell bundling groups are defined, cell bundling group 0 and cell bundling group 1, where respectively 3 different cells are assigned to each cell bundling group. In particular, cell 0 (PCell), cell 2, and cell 5 are assigned to cell bundling group 0, whereas cells with the index 1, 3, and 4 are assigned to cell bundling group 1. Of course, this particular grouping of the 6 cells assumed to be configured for the UE is only exemplary. Although the exemplary scenario chosen for explaining the various exemplary embodiments has two cell bundling groups defined to group the exemplary 6 cells, only one cell bundling group or three cell bundling groups can be defined to group the 6 cells assumed to be configured for the UE.

For the FDD system it is assumed that the HARQ feedback timing, as explained in the background section, is such that HARQ feedback is provided in the uplink 4 subframes after a corresponding downlink transmission. According to the exemplary embodiments of the invention, cross-carrier bundling is performed per subframe and per cell bundling group, as illustrated for subframe 0 in FIG. 15. Consequently, for cell bundling group 0, HARQ feedback if generated in subframe 0 for the various cells of cell bundling group 0, is bundled together (by use of a logical-AND operation) so as to be transmitted in subframe 4 of the PCell. Put differently, the HARQ feedback generated for subframe 0 respectively of cells 0, 2, and 5 are bundled together so as to generate a bundled HARQ.

For example, in case that the UE would have received and correctly decoded three downlink transmissions, respectively one in subframe 0 of cells 0, 2, and 5, the UE would have generated 3 ACKs so as to be transmitted to the radio base station. By bundling these 3 ACKs (in this case to one ACK, by the logical-AND operation), only one ACK, instead of the three ACKs, is going to be transmitted to the eNodeB in subframe four of the PCell. Of course, the bundling of the HARQ feedback also allows to bundle NACK(s) and DTX(s), as known from current operation of HARQ.

The same is applied to cell bundling group 1, grouping/bundling the HARQ feedback generated in subframe 0 of cells 1, 3, and 4 to transmit the bundled HARQ feedback via subframe 4 of the PCell. As a result, two HARQ feedbacks are transmitted via subframe 4 of the PCell, e.g., by using the PUCCH format 1b with channel selection to transmit both, alternatively PUCCH format 3 may be used if so configured by eNB.

As can be appreciated from the above discussion of the concept applied to FDD, the number of HARQ feedback depends on the number of cell bundling groups, and is independent from the number of cells respectively assigned to the cell bundling groups due to the applied cross-carrier bundling concept.

Figure 15:
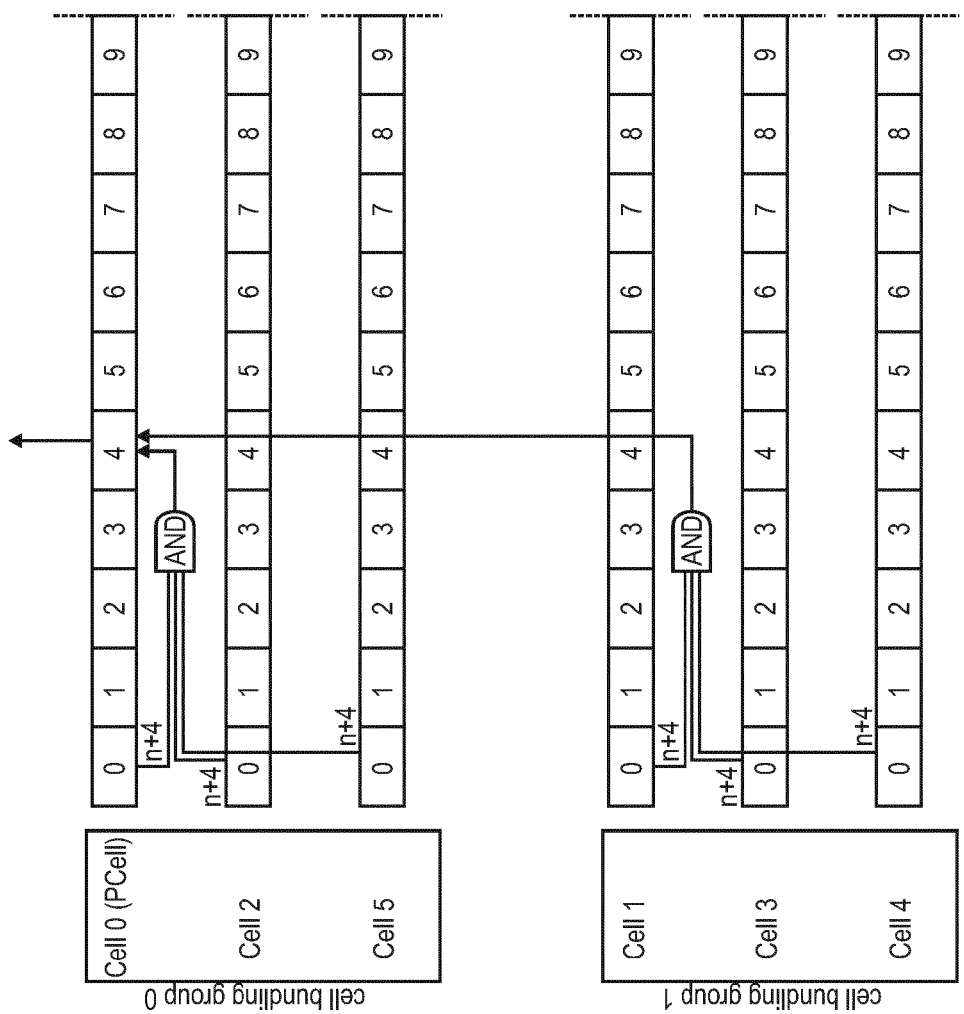
FIG. 15 illustrates the improved HARQ operation for FDD and carrier aggregation according to one exemplary embodiment.

Although not illustrated in FIG. 15, the same can be repeated for each subframe of the radio frame.

One advantage of this concept is that PUCCH overhead can be limited especially when the number of configured carriers supported is increased to up to 32 carriers. The overall UL resources needed for PUCCH transmission is reduced when UL resources are a limitation.

Another advantage of this concept is that DL carrier aggregation can be supported for UL-power-limited UEs. When the UL channel condition and interference situation are different from DL, DL can be configured with multiple carriers, while limited number of ACK/NACK bits are transmitted on UL. For UEs with different UL SINR, different level of bundling can be configured, so that different number of ACK/NACKs are transmitted on UL.

Another advantage of this concept is that dynamic cell selection can be achieved. It means that a large number of serving cells are configured for one UE, so that eNB can dynamically choose among those cells on which cell to schedule the UE. In this case, a large number of DL serving cells are configured. However, only a few of them are scheduled at the same time. This concept can support dynamic cell selection without increasing UL overhead.

In a further improvement of this concept applied to FDD, the downlink assignment index (DAI) already known from TDD usage (see e.g., background section) can be implemented so as to feed back a third state (DTX) for the same purpose as in the HARQ operation explained in the background section. In more detail, in general the DAI shall still indicate the number of downlink transmissions that the UE should have received so far in the bundling window. The bundling window for this exemplary scenario of FIG. 15 can be considered to be for each subframe and for each cell bundling group the respective different cells within the cell bundling group. For example, for cell bundling group 0, one bundling window for subframe 0 would comprise HARQ feedback from cell 0, cell 2, and cell 5, the next bundling window referring to subframe 1 and again comprising HARQ feedback from cells 0, 2, and 5; and so on. Correspondingly, the eNodeB would successively increase and transmit the corresponding downlink assignment index in the corresponding PDCCH in the order of increased serving cell index within one cell bundling group. For example, if there is PDSCH transmission on cell 0, the DAI in corresponding PDCCH would indicate "00". If there is also PDSCH transmission on cell 2, the DAI in corresponding PDCCH would indicate "01" and so on. However, if there is no PDSCH transmission on cell 2, but there is PDSCH transmission on cell 5, the DAI in corresponding PDCCH would indicate "01".

Having described the concept for FDD operation, in the following it will be described for TDD operation of the cells. As explained before in the background section, the HARQ feedback for TDD operation is more complicated since several ACK/NACK may have to be transmitted within the same uplink subframe (for each cell) (see e.g., FIG. 6a). Consequently, compared to the above-explained implementation of the exemplary embodiments for FDD, the exemplary embodiments applicable to TDD will be more complicated as well. However, the concept of using cell bundling groups so as to group the HARQ feedback of several cells together is the same.

The same assumptions as for the FDD operation can be taken, i.e., a UE being configured with 6 cells in total, wherein 2 cell bundling groups with 3 cells each are configured for the UE. First, it is assumed for ease of illustration that all cells are operated according to the same TDD UL/DL configuration, in this case configuration 1 (similar to the example used to describe in the background section the currently standardized HARQ operation in connection with FIG. 11).

Due to the fact that the HARQ operation for TDD may involve the transmission of ACK/NACK/DTX of several previous downlink subframes from one cell within the same uplink subframe, two alternative exemplary embodiments are possible on how to bundle the feedback information, actually pending to be transmitted within the respective uplink subframe. The first alternative exemplary embodiment will be explained in connection with FIGS. 16 to 18, while the second alternative exemplary embodiment will be explained in connection with FIGS. 19 to 21. According to the first alternative exemplary embodiment, for each uplink subframe of the cell via which the PUCCH will be transmitted (in this case assumed to be the PCell), cross-carrier bundling of the HARQ feedback, in a particular order of the HARQ feedback, will be performed within each cell bundling group, such that the bundled feedback items of the different cells of the same cell bundling group and of the same order are bundled. Put differently, for each cell bundling group, the HARQ feedback items generated in relation to previous (downlink) subframes of all the cells of the respective cell bundling group, are bundled in a particular order so as to generate one bundled HARQ feedback information per HARQ feedback item order and per cell bundling group. The above concept will become clearer when being described with the exemplary scenarios chosen for FIG. 16-18.

Figure 16:
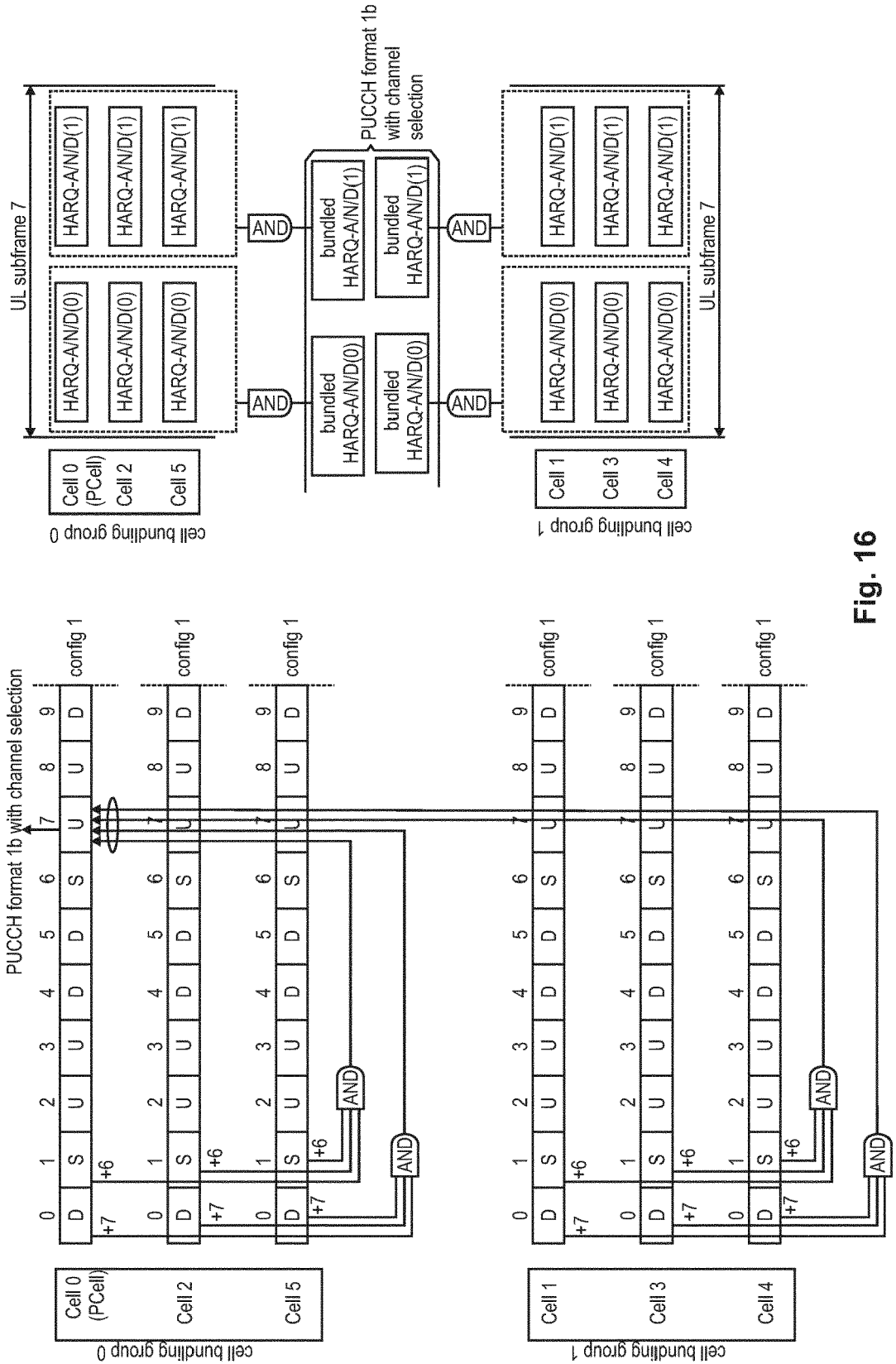
FIG. 16, 17 illustrates the improved HARQ operation for TDD and carrier aggregation with 6 component carriers which are all operated according to the same TDD UL/DL configuration according to a first alternative exemplary embodiment.

With reference to FIG. 16, the HARQ feedback operation being performed for uplink subframe 7 of the PCell according to the first alternative exemplary embodiment will be explained. As assumed already before, the HARQ timing from the currently standardized HARQ operation (see FIG. 6a, 6b) shall be (re)used, i.e., the timing that, for this exemplary case, in uplink subframe 7 HARQ feedback for subframes 0 and 1 of the same radio frame are to be provided to the radio base station. Correspondingly, for each of the 6 cells being operated according to the TDD UL/DL configuration 1, the HARQ feedback for subframes 0 and 1, if generated, shall be transmitted to the radio base station via uplink subframe 7 (of the PCell, which in this exemplary scenario is assumed to be used for transmitting the PUCCH).

As apparent from FIG. 16, the HARQ feedback is bundled across the various cells being associated within one cell bundling group such that the HARQ feedback relating to subframe 0 of cells 0, 2, and 5 are bundled together (using the logical-AND operation). The same applies to the HARQ feedback relating to subframe 1 of cells 0, 2, and 5 of cell bundling group 0, the three HARQ feedback items being bundled together. The same applies to cell bundling group 1 and its respective cells 1, 3, and 4, where bundled HARQ feedbacks are generated for subframe 0 and for subframe 1. These four bundled HARQ feedbacks are to be transmitted via the PCell in uplink subframe 7.

On the right-hand side of FIG. 16, the same bundling of the HARQ feedback pending to be transmitted in uplink subframe 7 is illustrated in a different manner. The right-hand side of FIG. 16 takes the perspective of uplink subframe 7 and illustrates which HARQ feedback of which subframes may be pending for the two cell bundling groups and their respective 3 cells. Correspondingly, due to the simple scenario chosen for FIG. 16, for each cell of both cell bundling groups HARQ feedback (ACK/NACK/DTX, i.e., A/N/D) may be pending for subframes 0 and 1 (i.e., HARQ-A/N/D(0) and HARQ-A/N/D(1)). The particular order mentioned above, to which the bundling adheres, may be for example the order of the subframes as indicated by the HARQ feedback timing table of FIG. 6a/6b. In this particular case of TDD UL/DL configuration 1 and uplink subframe 7, HARQ feedback for subframe 0 (i.e., "−7") is of the first order, while HARQ feedback for subframe 1 (i.e., "−6") is of the second order. Correspondingly, for each cell bundling group, first, the HARQ feedback for that subframe of the first order of each of the cells of the respective cell bundling group is bundled together; then, the HARQ feedback for that subframe of the second order of each of the cells of the respective cell bundling group is bundled together as illustrated on the right-hand side of FIG. 16; and so on.

Correspondingly, bundled HARQ back feedback information is generated per order of the available HARQ feedback (i.e., pending to be transmitted), per cell bundling group, which is then transmitted per uplink subframe.

Figures 5, 6A, 6B:
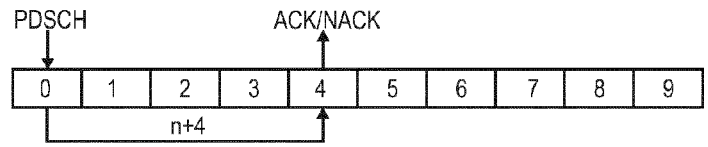
FIG. 5 illustrates the synchronous HARQ operation for FDD based on a downlink transmission in subframe 0 with a corresponding ACK/NACK transmission in subframe 4, FIG. 6a, b illustrates the HARQ ACK/NACK/DTX feedback timing for the static TDD configurations 0-6 as defined by 3GPP LTE.
Figure 7:
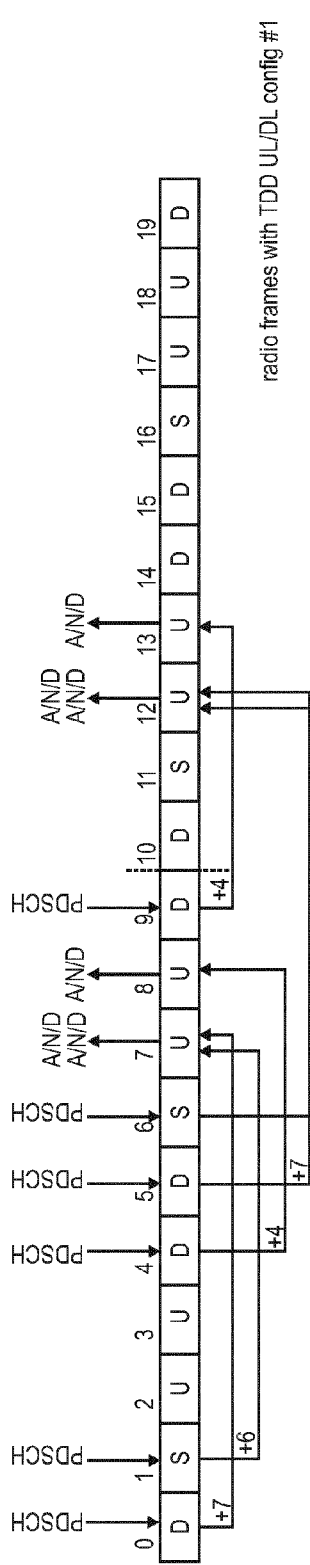
FIG. 7 illustrates the asynchronous HARQ operation and grouping of ACK/NACK for TDD, taking as example the TDD configuration 1.
Figure 9:
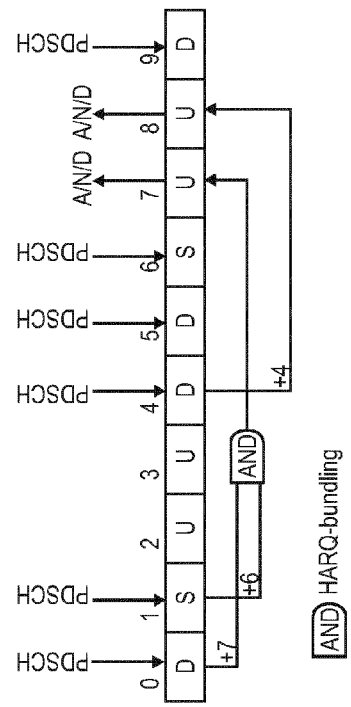
FIG. 9 illustrates schematically the HARQ bundling based on the example of FIG. 7.
Figure 8:
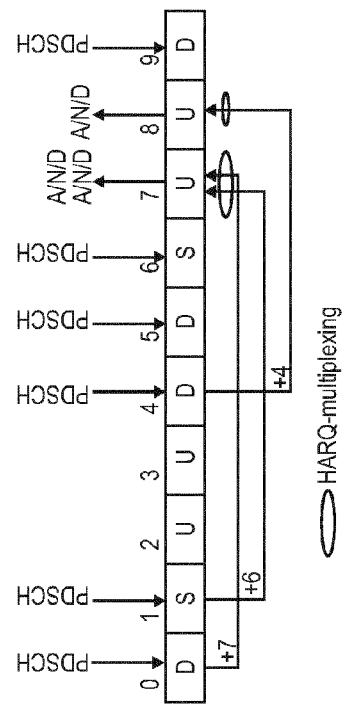
FIG. 8 illustrates schematically the HARQ multiplexing based on the example of FIG. 7.
Figure 10:
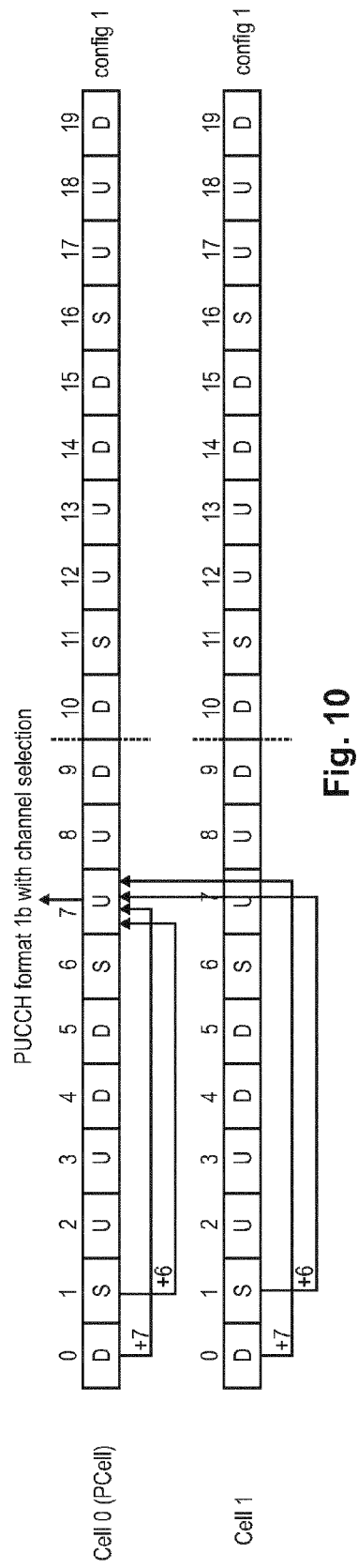
FIG. 10 illustrates the HARQ operation for TDD and carrier aggregation with two component carriers.
Figure 11:
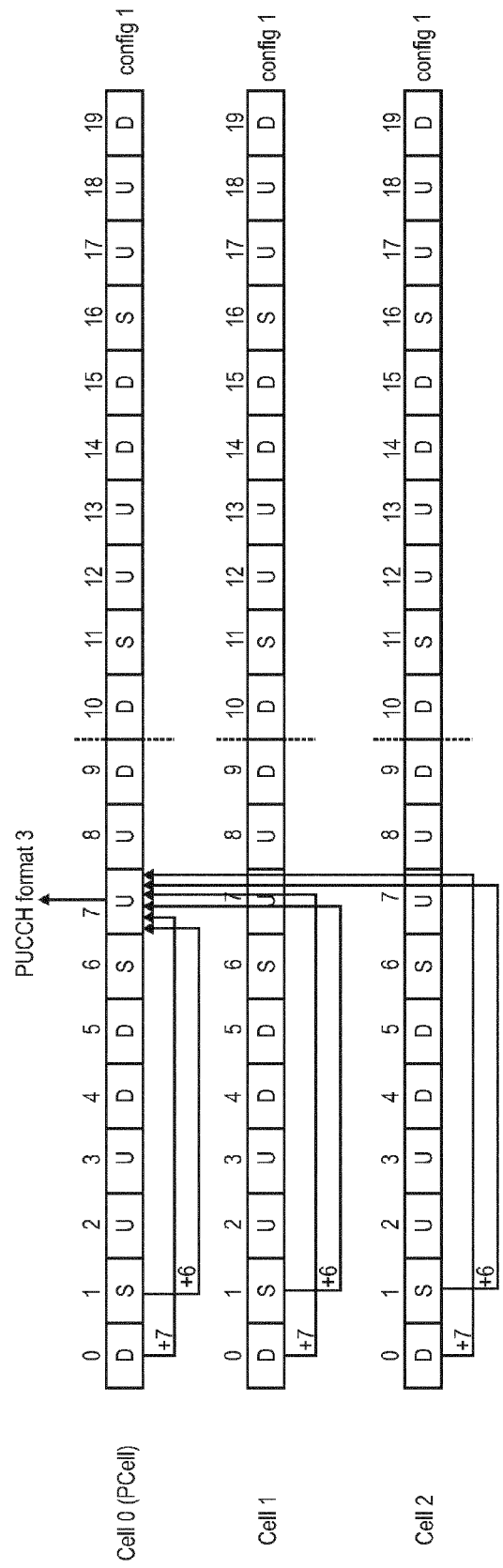
FIG. 11 illustrates the HARQ operation for TDD and carrier aggregation with three component carriers, which are operated according to the same TDD UL/DL configuration, FIG. 12, 13 illustrate the HARQ operation for TDD and carrier aggregation with respectively two component carriers, which are operated according to different TDD UL/DL configuration.
Figure 12:
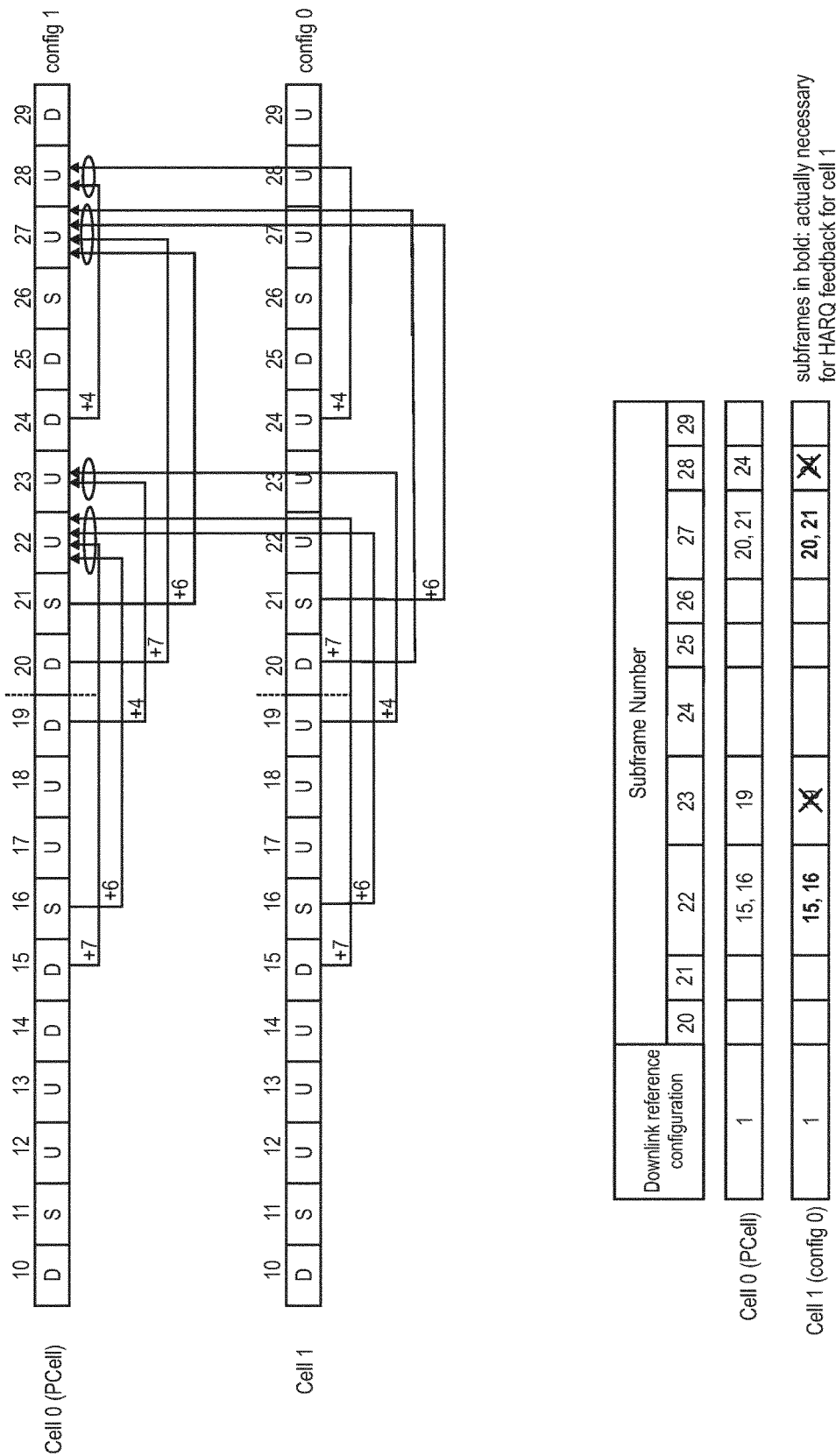
Figure 13:
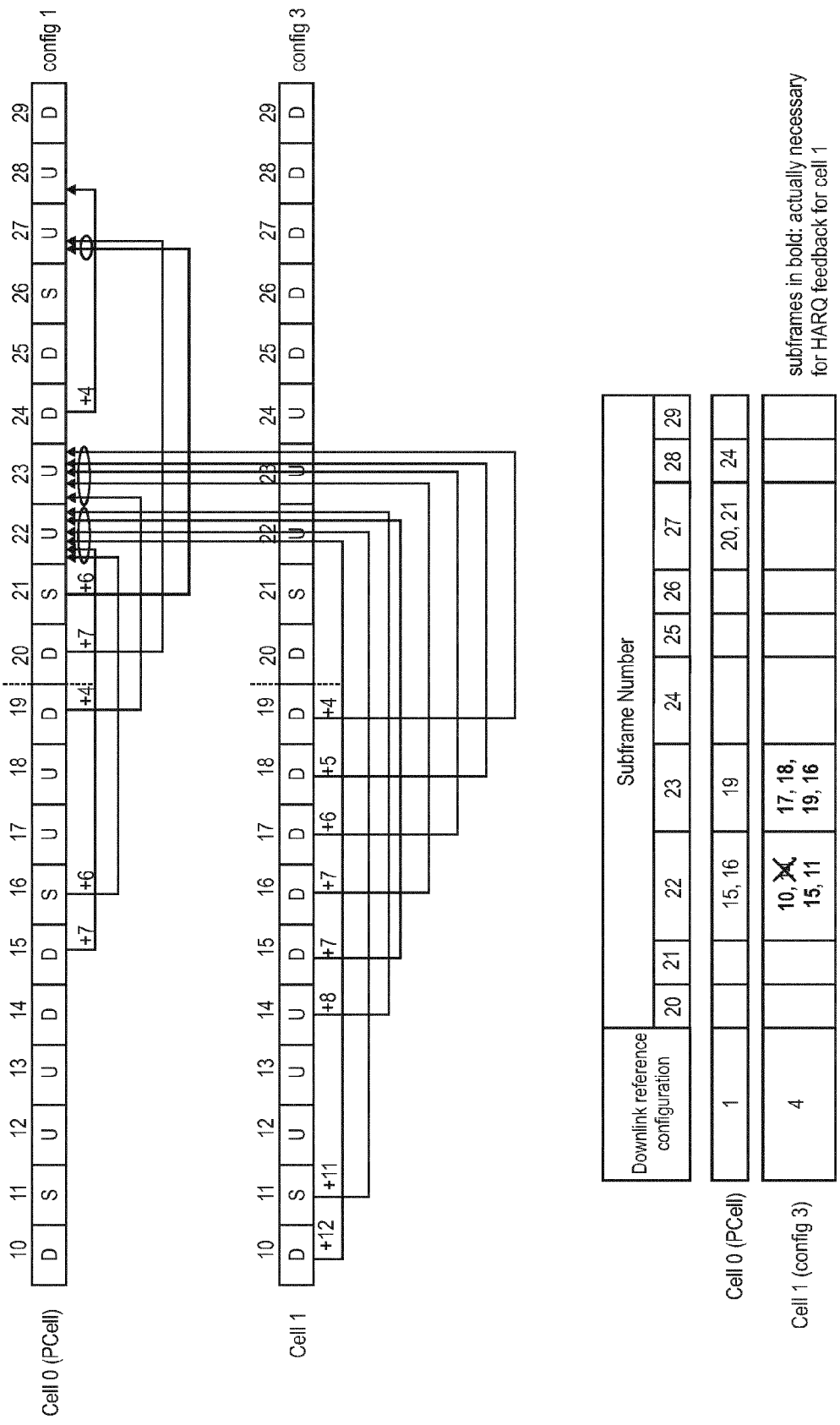
Figure 14:
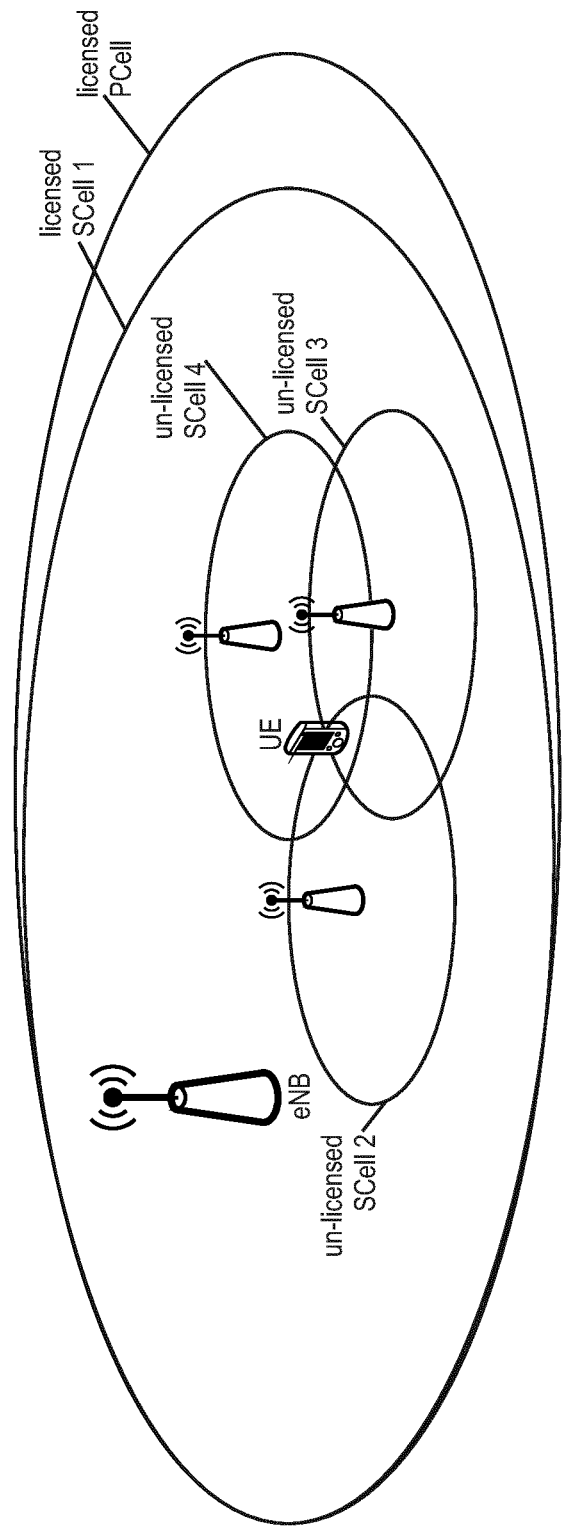
FIG. 14 illustrates an exemplary licensed-assisted access scenario, with various licensed and unlicensed cells.
Figure 17:
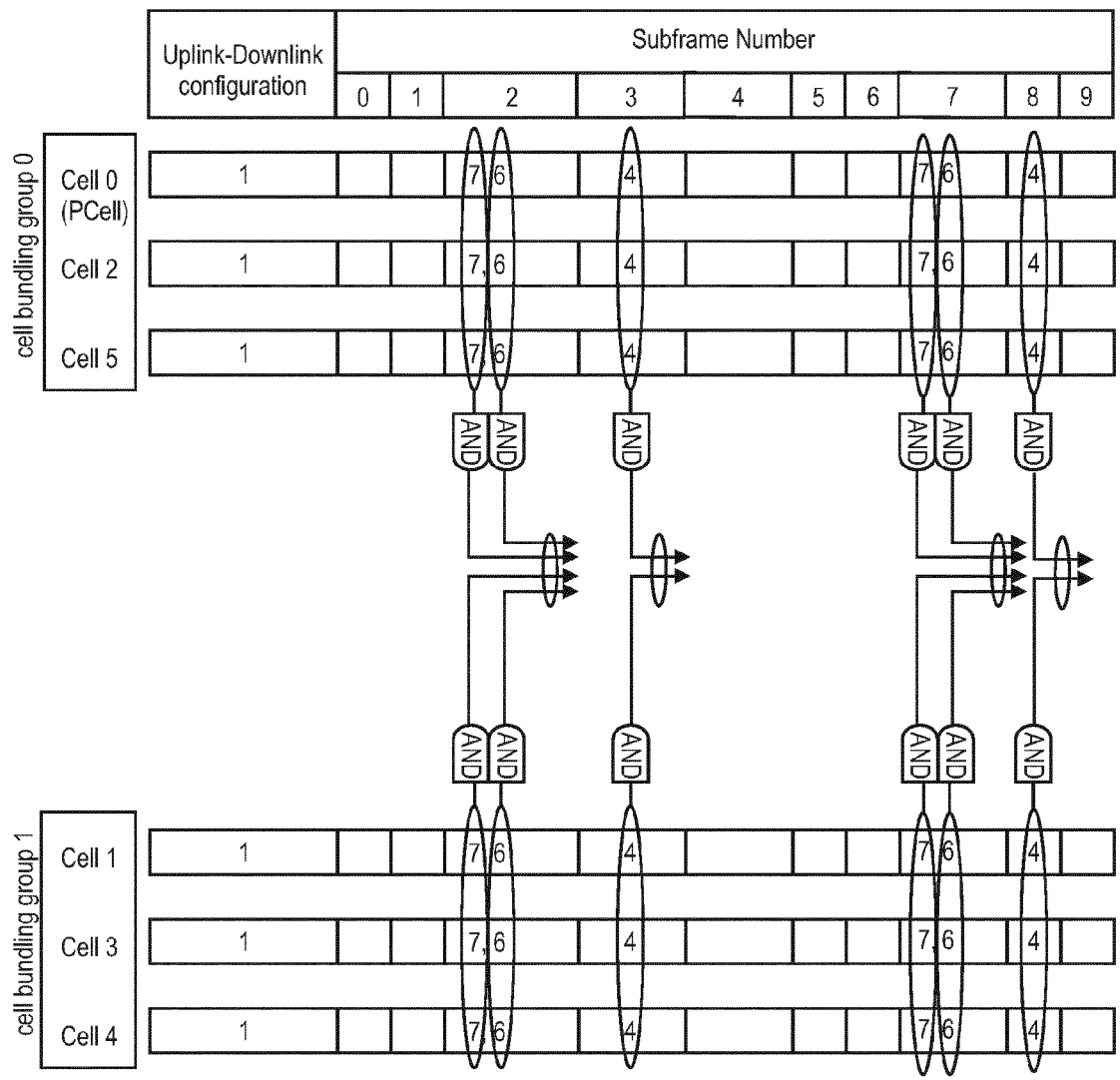

FIG. 17 illustrates, in still another manner, the same first alternative exemplary embodiment already described in connection with FIG. 16, the illustration being based on FIG. 6a which illustrates the different HARQ feedback timings to be adhered to by the different cells operated according to the TDD UL/DL configuration 1. FIG. 17 is not only restricted to the HARQ feedback to be transmitted in uplink subframe 7 but illustrates how to apply the concept to all corresponding uplink subframes, which may then be repeated for every radio frame. As can be seen therefrom, for uplink subframe 3, in each cell HARQ feedback relating to a subframe, being 4 subframes before i.e., subframe 9 of the previous radio frame, may be pending to be transmitted. According to the first alternative exemplary embodiment, the respective HARQ feedback relating to that subframe 9 of the previous radio frame, for each cell of the cell bundling group, is bundled to generate bundled HARQ feedback per cell bundling group, which may be then be processed further to be transmitted together in the uplink.

For the actual transmission of the HARQ feedback, it is assumed that the bundled HARQ feedback is multiplexed and that the UE will select an appropriate PUCCH format to carry all the generated and bundled HARQ feedback. For instance, in this particular scenario and considering the uplink feedback in subframe 7, where four (bundled) HARQ feedback are to be transmitted for two cell bundling groups, for instance PUCCH format 1b with channel selection can be used, where each cell bundling group is treated as being a separate cell (compare with FIG. 10 as explained in the background section).

In the above scenario it has been assumed that the 6 cells configured for the UE would be operated according to the same TDD UL/DL configuration. However, the exemplary embodiments are also applicable to the case where cells are operated according to different TDD UL/DL configurations. In particular, as mentioned above, the particular exemplary embodiments can reuse the HARQ timings as defined for the currently-standardized HARQ operation, which also at the moment supports HARQ operation for TDD with carrier aggregation where various cells are operated according to different TDD UL/DL configurations, as has been explained in the background section in connection with FIGS. 12 and 13.

Figure 18:
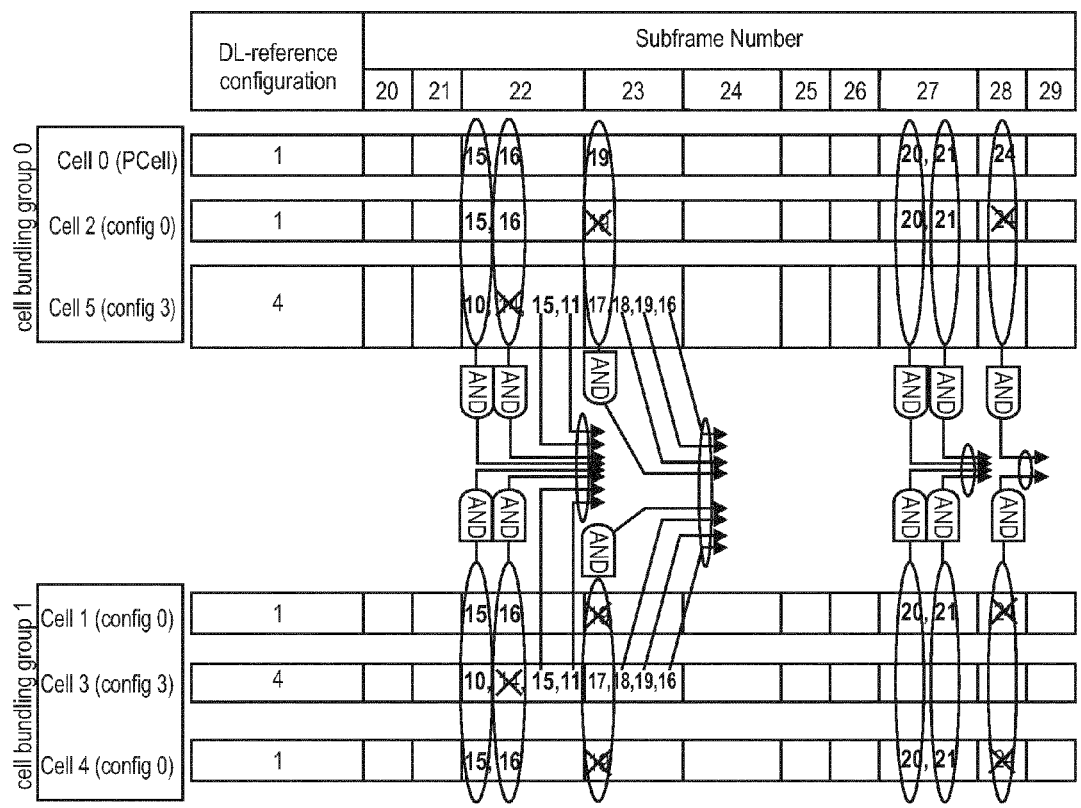
FIG. 18, 19 illustrates the improved HARQ operation for TDD and carrier aggregation with 6 component carriers which are operated according to the different TDD UL/DL configurations according to a first alternative exemplary embodiment.

In FIG. 18 the same first alternative exemplary embodiment is applied as used before for FIGS. 16 and 17, however the various cells do not all use the same TDD UL/DL configuration. FIG. 18 is based on the HARQ timing as explained in connection with FIG. 6b, i.e., directly indicating the subframes for which HARQ feedback is pending in the respective uplink subframe. Rather, it is assumed for explanatory purposes that the PCell uses TDD configuration 1, that cells 1, 2, and 4 use TDD UL/DL configuration 0, and that cells 5 and 3 use TDD UL/DL configuration 3. FIG. 18 shows how the different HARQ feedback of the various cells are bundled in accordance with the HARQ feedback timing as given for each cell. FIG. 18 illustrates for each cell the corresponding HARQ feedback timing which is applied. In the same manner as explained in the background section in connection with FIGS. 12 and 13, the particular HARQ feedback timing of SCells being operated according to a different TDD configuration than the PCell (which is used for transmitting the PUCCH) may not need to be the same as that directly defined by the HARQ feedback table of FIG. 6a, 6b, but may rather follow the one from another DL-reference configuration. Correspondingly, in this scenario chosen for FIG. 18, the HARQ feedback timing of cells 1, 2, and 4 (all of which are configured to operate according to TDD UL/DL configuration 0) will follow the HARQ feedback timing of TDD UL/DL configuration 1, where those subframes that are not downlink subframes but uplink subframes (i.e., HARQ feedback for uplink subframe 14) are crossed out. Similarly, the HARQ feedback timing of cells 4 and 5 (both of which are configured to operate according to TDD UL/DL configuration 3) will actually follow the HARQ feedback timing of TDD UL/DL configuration 4, where again those subframes that actually relate to uplink subframes (i.e., HARQ feedback for subframes 19 and 24) are crossed out.

Based on the concept of the first alternative exemplary embodiment as explained before, the HARQ feedback is bundled based on the order of the HARQ feedback across the various cells being associated to one cell bundling group. For example, for uplink subframe 22 and cell bundling group 0, at most, HARQ feedback may be pending for subframes 15, 16 of cells 0 and 1 and for subframes 10, 14 (here DTX), 15, and 11 of cell 5. Correspondingly, HARQ feedback for previous downlink subframes 15, 15, and 10 for respective cells 0, 2, and 5 is of the same first order and correspondingly bundled together. This applies similarly to the second order HARQ feedback of uplink subframe 22, where the HARQ feedback for previous downlink subframe 16 of respective cells 0 and 2 and the DTX for uplink subframe 14 of cell 5 are bundled together. Since there is no other third order HARQ feedback for uplink subframe 22, HARQ feedback relating to previous downlink subframes 15 and 11 of cell 5 are not bundled but transmitted on their own. The same concept is applied separately to cell bundling group 1 and its subframe 22. The bundled HARQ feedback and non-bundled HARQ feedback generated in this manner in uplink subframe 22 may then be (multiplexed and) transmitted in the uplink to the eNodeB via the PCell.

This similarly applies to each corresponding uplink subframe as apparent from FIG. 18.

Figure 19:
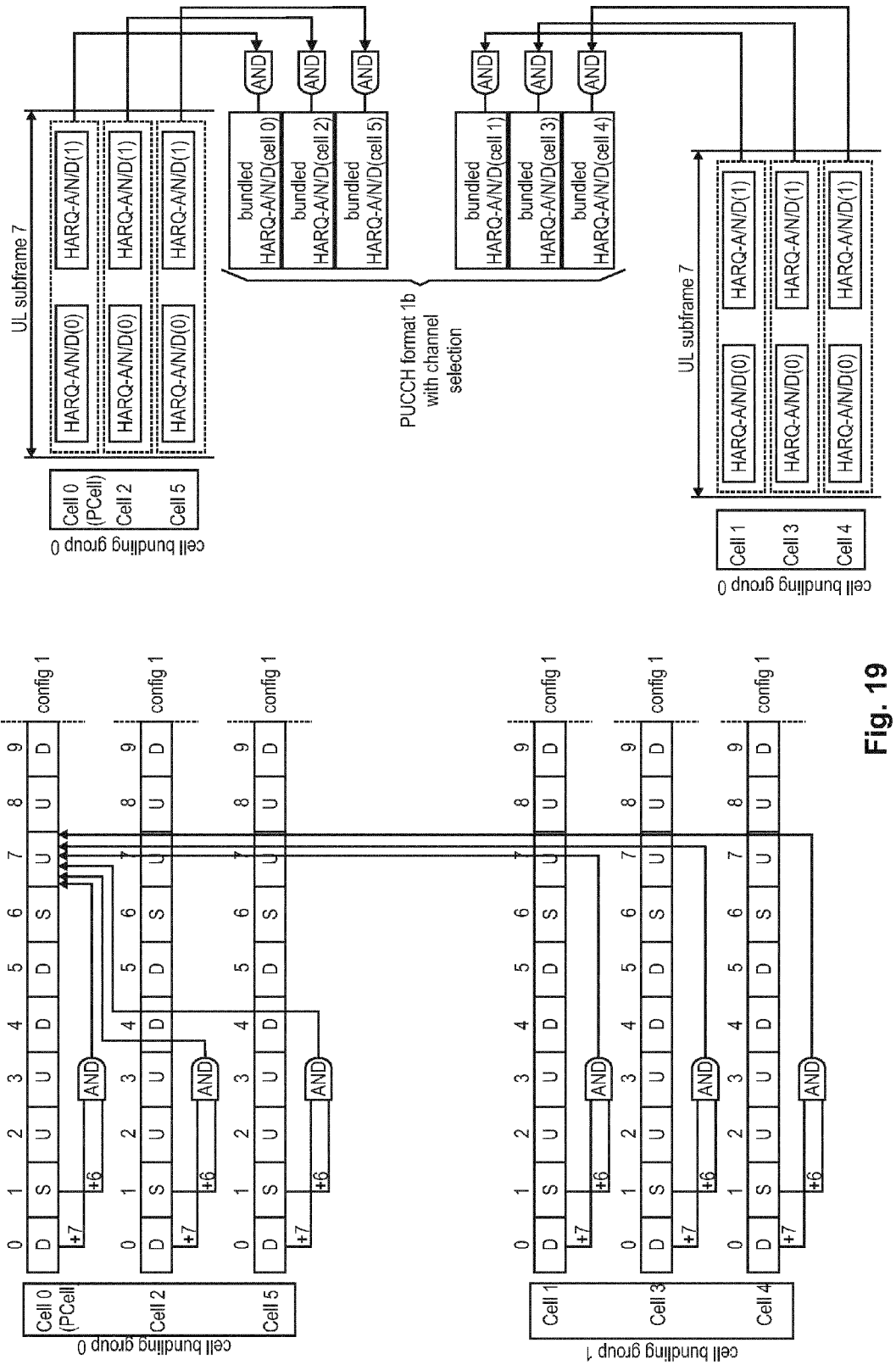

In the following, the second alternative exemplary embodiment will be described which can be used for bundling HARQ feedback for cells operating in TDD. Also for the second alternative exemplary embodiment the same scenario as already assumed for FIG. 16-18 can be assumed. Correspondingly, FIG. 19 shows the cell aggregation of 6 cells being operated according to TDD UL/DL configuration 1, where cell bundling groups 0 and 1 are defined for the UE, each being associated with three of these cells. In correspondence with the explanation given in connection with FIG. 16, the second alternative exemplary embodiment is illustrated for operation in uplink subframe 7 of the PCell where HARQ feedback for previous downlink subframes 0 and 1 may be pending for being transmitted for each cell.

According to this second alternative exemplary embodiment, the feedback information items are bundled within each cell and are then multiplexed within the cell bundling group. Put differently, the bundling is performed so as to bundle feedback information items of the same cell. This can be appreciated from FIG. 19 where for each cell the HARQ feedback for subframes 0 and 1 of the respective cell is bundled together (by use of a logical AND operation). As apparent from the right-hand side of FIG. 19, a bundled HARQ feedback is generated per cell, and then concatenated in an increasing order of the index of the respective cells within the cell bundling group (here HARQ feedback for cell 0 first, then the HARQ feedback for cell 2, and finally the HARQ feedback for cell 5). Then, the thus generated and bundled HARQ feedback is multiplexed so as to be transmitted to the eNodeB via the PCell.

Figure 20:
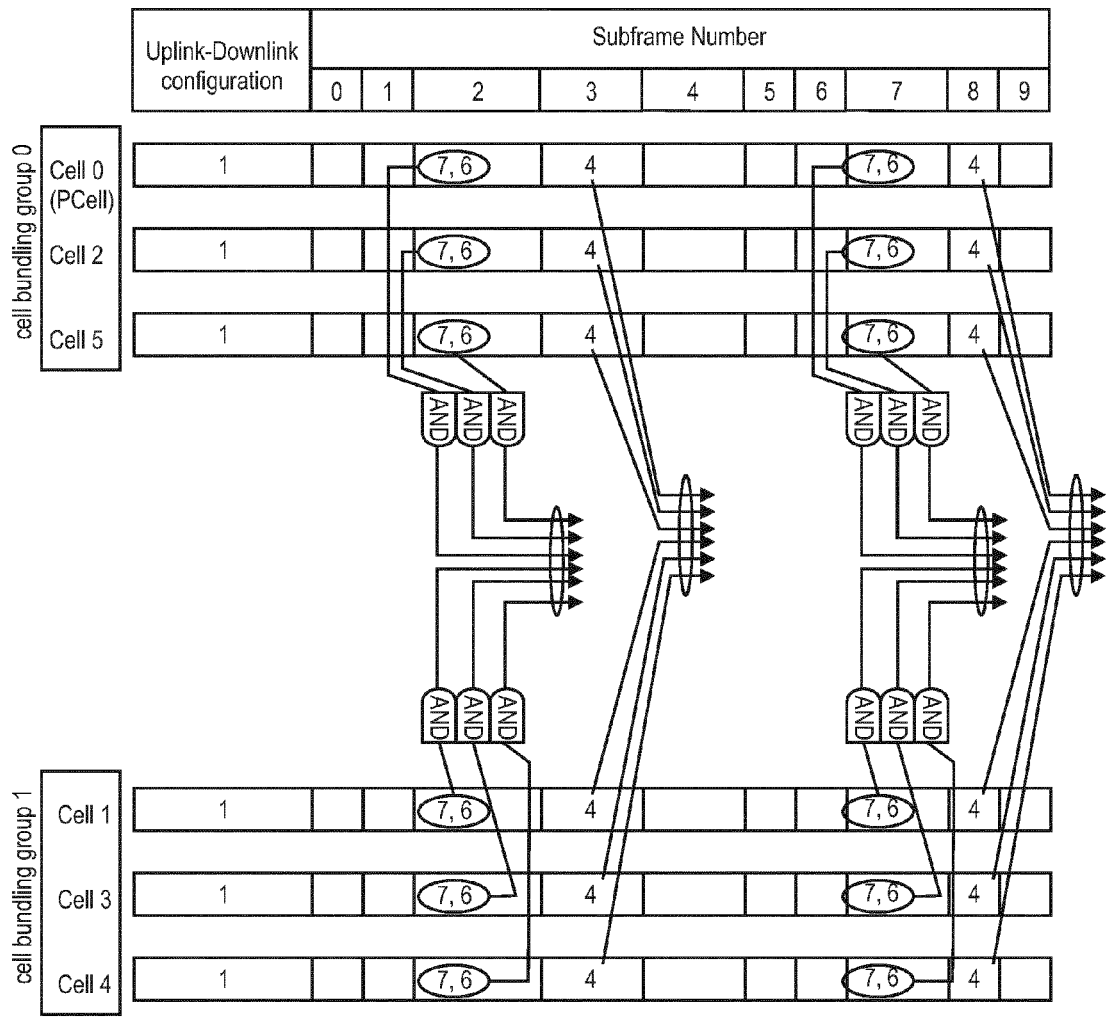
FIG. 20 illustrates the improved HARQ operation for TDD and carrier aggregation with 6 component carriers which are operated according to the same TDD UL/DL configuration according to a second alternative exemplary embodiment.

FIG. 20 illustrates this concept not only for uplink subframe 7 but also for the other uplink subframes of the radio frame, i.e., uplink subframes 2, 3, and 8. Correspondingly, for subframes 3 and 8, no bundling is performed since HARQ feedback information for only one subframe is available per cell; instead the HARQ feedback information is directly multiplexed with the other HARQ feedback of the remaining cells of the cell bundling groups.

As a result, bundled feedback information is generated for each uplink subframe and for each cell within a cell bundling group.

Figure 21:
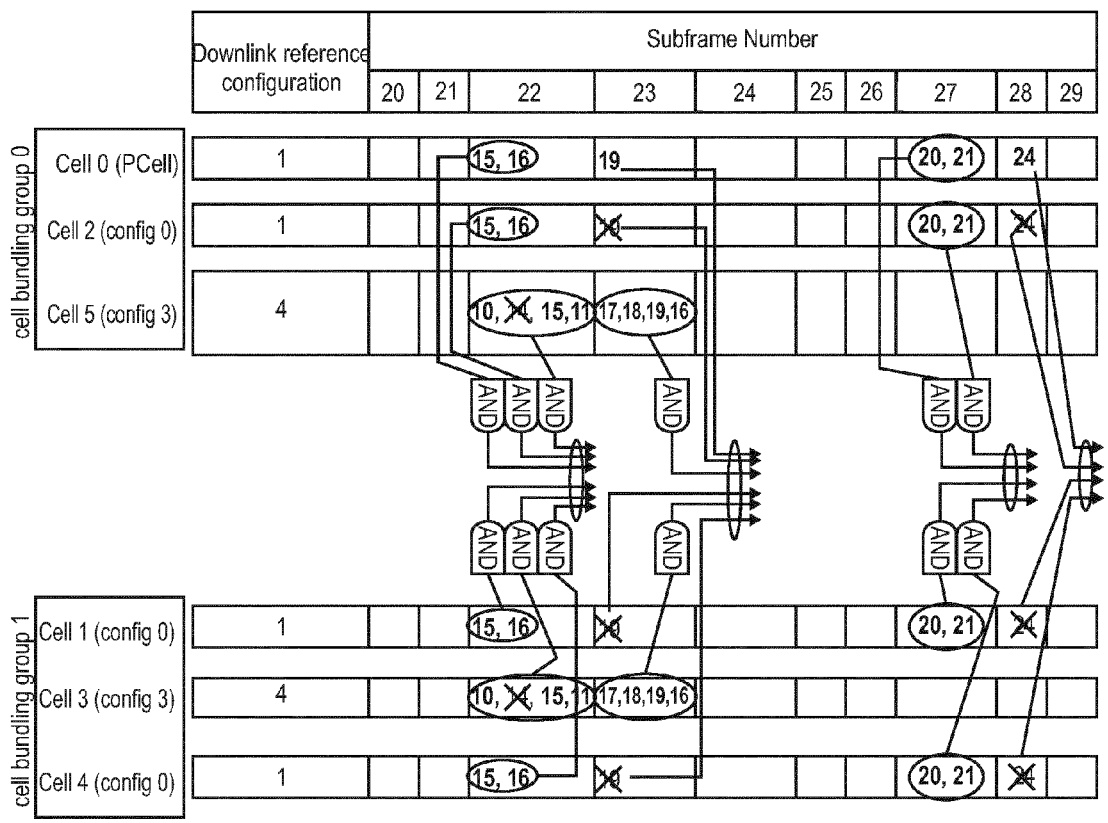
FIG. 21 illustrates the improved HARQ operation for TDD and carrier aggregation with 6 component carriers which are operated according to different TDD UL/DL configuration according to a second alternative exemplary embodiment.

The second alternative exemplary embodiment may also be applied to a TDD scenario where the several cells have different TDD configurations. FIG. 21, in a similar manner as FIG. 18, assumes a scenario with TDDs configurations as depicted. In contrast to FIG. 18, the bundling is performed within a cell (not across the cells) as explained in connection with FIG. 20 resulting in the bundling as depicted in FIG. 21.

In the above exemplary embodiments it has been assumed that the generated, bundled and multiplexed HARQ feedback information is transmitted to the eNodeB in the uplink (e.g., via the PCell). For simplicity it can be said that the UE selects the appropriate PUCCH format so as to carry the HARQ feedback. It is not the focus of the present invention how the HARQ feedback is transmitted to the eNodeB. Consequently, PUCCH formats and corresponding mechanisms as already used by the systems described in the background section can be reused as much as possible.

In general, due to the bundling mechanisms as explained for the first and second alternative embodiments, the bundled HARQ feedback of one cell bundling group can be seen from transmission perspective as relating to a single "virtual" cell.

There are many options as to how HARQ feedback can be transmitted, and thus the UE would have to select the appropriate PUCCH format e.g., based on the amount of bits (which in turn depends e.g., whether spatial multiplexing is used or not) that is to be transmitted. In a similar manner as described in the background section, the UE may select from case to case how to transmit the HARQ feedback, and additionally may or may not be configured to use particular PUCCH formats or to use PUSCH.

For example, currently PUCCH format 1b with channel selection is only supporting transport of HARQ feedback for two cells. Correspondingly, PUCCH format 1b with channel selection could be used for transmitting bundled HARQ feedback generated for two different cell bundling groups. However, if there are more than two cell bundling groups, for example PUCCH format 3 might have to be selected by the UE for the HARQ feedback transport.

However, as also explained in the background section, PUCCH format 3 only supports a limited amount of bits (e.g., 20 bits) of HARQ feedback information. Therefore, there may be a need for a new PUCCH format which supports an even larger amount of bits of HARQ feedback. Alternatively, multiple PUCCH transmissions on the PCell can be performed to transport a large number of bits of HARQ feedback.

Still alternatively, the HARQ feedback may be transmitted via the PUSCH, if so (allowed) configured by the eNodeB.

The two alternative exemplary embodiments for the TDD operation of cells thus allow to handle a large number of ACK/NACK/DTX generated for an increasing number of cell, which thus can be transmitted with limited PUCCH resources. As already mentioned in connection with the FDD embodiment, the eNB can decide how many cell bundling groups to define, and how to distribute the various cells to the cell bundling groups, thereby having control of the amount of bundling to be performed which may then be adjusted to the conditions and/or capabilities of the UE.

A further advantage in connection with the first alternative exemplary embodiment, explained in connection with FIG. 16-18, the impact of the downlink throughput can be minimized by scheduling only one or a few carriers on the same subframe. In the first alternative, bundling is applied cross the serving cells. If we assume that although multiple carriers are configured, but only a few carriers are scheduled at the same time for UL power limited UEs, the additional downlink retransmission caused by ACK/NACK bundling is limited.

On the other hand, an advantage in connection with the second alternative embodiment, explained in connection with FIG. 19-21, is that retransmissions caused by the HARQ bundling only impact the same carrier, since the bundling is performed on the HARQ feedback within a cell. It would not cause retransmission on another cell. Besides, the channel on one carrier belongs to the same frequency band. Considering that the channel condition on one frequency band does not fluctuate dramatically within one radio frame (i.e., 10 ms), the HARQ feedback information of PDSCH transmissions within one frame (i.e., 10 ms) is correlated. Therefore, the chance that they are all ACK or NACK is high. Thus, bundling of ACK/NACKs within one frame on one frequency band does not deteriorate the DL throughput.

As already explained for the FDD solution in connection with FIG. 15, the HARQ operation can be improved even more by implementing the downlink assignment index (DAI) already known from the background section so as to feed back a third state (DTX) for the similar purpose as in the HARQ operation explained in the background section. Consequently, the DAI shall indicate the number of downlink transmissions that the UE should have received so far in the bundling window. The bundling window for the first alternative TDD solution where cross carrier bundling is used, is also across the carriers within a cell bundling group, e.g., considering uplink subframe 22 of cell bundling group 0 of FIG. 18, cell 0, cell 2, and cell 5 for respectively the first and second order of HARQ feedback form two bundling windows.

For example when assuming that corresponding downlink transmissions are indeed performed, the DAI for the PDCCH relating to the downlink subframe 15 of the cell 0 could indicate 0, the DAI for the PDCCH relating to the downlink subframe 15 of the cell 2 could indicate 1, and the DAI for the PDCCH relating to the downlink subframe 10 of cell 5 could indicate 2. Alternatively, when assuming that on downlink subframe 15 of cell 2 no downlink transmission is performed by the eNodeB, the eNodeB would transmit the DAI for the PDCCH relating to the downlink subframe 15 of cell 0 to indicate 0, and that the DAI for the PDCCH relating to the downlink subframe 10 of cell 5 would indicate 1. This would allow the UE to derive that for downlink subframe 15 of cell 2 no downlink transmission is to be expected and a DTX is to be correspondingly fed back as HARQ feedback for that downlink subframe.

On the other hand, for the second alternative solution, where cross subframe bundling is used, the bundling window is across downlink subframes within a cell and uplink subframe, e.g., considering uplink subframe 22 of cell 5 of FIG. 21, the bundling window includes HARQ feedback for subframes 10, 14, 15, and 11. Correspondingly, the DAI would be transmitted by the eNodeB in the corresponding PDCCH(s) of the downlink transmissions of the respective bundling windows, the DAI increasing with the number of transmitted PDCCHs. For example, considering uplink subframe 23 of cell 5 of FIG. 21, the bundling window comprises HARQ feedback for four possible downlink transmissions. The eNodeB would correspondingly increase the number indicated by the DAI in accordance with the number of downlink transmissions actually performed in the bundling window. When assuming for illustration purposes that downlink transmissions on all 4 subframes are performed by the eNodeB, the eNodeB would define the DAI relating to the PDCCH of downlink subframe 17 of cell 5 to be 0, the DAI relating to the PDCCH of downlink subframe 18 of cell 5 to be 1, the DAI relating to the PDCCH of downlink subframe 19 of cell 5 to be to, and the DAI relating to the PDCCH of downlink subframe 16 of cell 5 to be 3.

In the above scenarios it was assumed that the downlink transmissions only included single codewords, i.e., that spatial multiplexing was not used. As will be explained now, the various embodiments are also applicable to scenarios where spatial multiplexing is employed by the eNodeB which thus transmits two codewords at the same time. In general it should be noted that spatial bundling, i.e., the bundling of the HARQ feedback for two codewords, may or may not be applied, depending on several conditions as explained in the background section, for example depending on the PUCCH format to be used for transmitting the HARQ feedback and/or depending on the number of HARQ bits to be transmitted. According to one embodiment, for spatial multiplexing scenarios, spatial bundling is used in the same situations as described in the background section, e.g., when there is only one HARQ feedback to be transmitted, no spatial bundling is used. Consequently, in the following explanations are given how the different embodiments presented above can be applied to a scenario with spatial multiplexing, where spatial bundling may or may not be used; for the functioning of the invention it is not important when exactly spatial bundling is used and when spatial bundling is not used. In any case, the various embodiments explained above support HARQ feedback transmission/bundling for spatial multiplexing scenarios, with or without spatial bundling.

In particular, first, the FDD scenario as explained in connection with FIG. 15 is considered and extended such that the downlink transmissions in subframe 0 of all cells comprise two codewords. If spatial bundling is applied, this is done before the cross-carrier bundling within the different cell bundling groups; thus, there is effectively no change for the process of the cross carrier bundling according to the explained embodiment since when starting the cross-carrier there is only one ACK/NACK/DTX (in this case for both codewords). On the other hand, when spatial bundling is not applied, the cross-carrier bundling is performed per codeword by bundling the HARQ feedback of the first codeword transmitted in subframe 0 of cells 0, 2, and 5; then, the HARQ feedback of the second codewords transmitted in subframe 0 of cells 0, 2, and 5 is bundled. Of course, the same is applied to the HARQ feedback of the two codewords of subframe 0 of the cells of cell bundling group 1.

Similar processing can be applied to scenarios where cells are operated according to a TDD configuration, where the following explanations are made in connection with FIGS. 16 and 19. As with the FDD solution, it may be assumed that the downlink transmission of subframe 0 of all cells includes two codewords, where corresponding HARQ feedback is to be fed back to the eNodeB in uplink subframe 7. As already mentioned for FDD, when spatial bundling is performed, the spatial bundling is performed before the cross-carrier bundling of the first alternative embodiment or the cross-subframe bundling such that there is effectively no change to the gist of the invention. When spatial bundling is not used, the cross-carrier bundling of the first alternative embodiment (e.g., FIG. 16) is performed per codeword, by bundling the HARQ feedback of the first codewords transmitted in subframe 0 of cells 0, 2, and 5; and then, bundling the HARQ feedback of the second codewords transmitted in subframe 0 of cells 0, 2, and 5; and so on.

When spatial bundling is not used, the cross subframe bundling of the second alternative embodiment (e.g., FIG. 19) is also performed per codeword, by bundling the HARQ feedback of the first codewords of subframes 0 and 1 in cell 0; and then, by bundling the HARQ feedback of the second codewords of subframes 0 and one in cells 0; and so on for all cells. Moreover, in the above scenarios it was assumed that the PCell is used to transmit the HARQ feedback within a corresponding PUCCH format. However, as already explained in the background section, in the future PUCCH may also be transmitted via SCells, for example by the use of different PUCCH Cell groups. The various exemplary embodiments discussed above are also applicable to such scenarios where PUCCH Cell groups are implemented. In particular, the definition of the cell bundling groups and their PUCCH Cell groups however must be coordinated in such a way that the cells being associated with a particular PUCCH cell group shall only be associated with a single cell bundling group. Put differently, all cells being associated with one of the cell bundling groups shall be associated with one of the PUCCH Cell groups such that each cell bundling group is associated with one of the PUCCH Cell groups. This is to ensure that the HARQ feedback information generated for one cell bundling group is transmitted via the cell used for transmitting the PUCCH of the respective PUCCH Cell group.

As one example, the cell bundling groups 0 and 1 could be identical to corresponding PUCCH cell groups 0 and 1, i.e., both respectively associating with the same cells. Assuming the scenarios used for explaining the invention in connection with FIGS. 16 to 21, PUCCH Cell group 0 could be associated with cell 0, 2, and 5 where cell 0 (PCell) would be used for transmitting the uplink control signaling, and PUCCH Cell group 1 could be associated with cells 1, 3, and 4 where cell 1 would be used for transmitting the uplink control signaling. In contrast to the previous exemplary embodiments, the HARQ feedback relating to the two cell bundling groups would not be transmitted together (multiplexed) within a PUCCH transmission but would be transmitted separately via the 2 cells, i.e., via the PCell for HARQ feedback relating to the cell bundling group 0, and via cell 1 for HARQ feedback relating to the cell bundling group 1. To said end, the UE needs to first determine which cell is actually to be used for the uplink transmission of the HARQ feedback, which it can do based on the association of the cells to a particular PUCCH cell group (i.e., the association of one cell bundling group to one PUCCH cell group). The association between one cell bundling group and one PUCCH cell group can be configured by higher layer signaling.

In the examples above, bundling is applied using Logical-AND operation. Another alternative is that the function of bundling is configured as a combination of Logical-AND and Logical-OR by higher layer signaling or implicitly determined by the QoS (Quality of Service) requirement of the PDSCH transmission. For example, for services of low QoS requirement (e.g., best effort service), Logical-OR is used, so that no unnecessary retransmission for other services within the same bundling group is triggered. For services of high QoS requirement (e.g., voice service), Logical-AND is used, so that retransmission will be triggered if there is a NACK to guarantee the quality of the service.

Further Embodiments

According to a first aspect, a method is provided where a user equipment provides feedback information of a retransmission protocol to a radio base station in a mobile communication system. The user equipment is configured with at least two cells. At least one cell bundling group is defined for the user equipment such that one of the at least one cell bundling group is associated with at least two out of the at least two cells. The user equipment is in communication with the radio base station to receive downlink transmissions via at least one of the at least two cells. The user equipment is configured to operate a retransmission protocol with the radio base station comprising the step of providing feedback information for the downlink communication via the at least two cells to the radio base station. For each cell bundling group, the UE is configured to bundle feedback information generated in connection with those cells being associated with the respective cell bundling group so as to generate bundled feedback information per cell bundling group.

Then, the UE transmits the bundled feedback information of each cell bundling group to the radio base station.

According to an advantageous variant of the first aspect which can be used in addition or alternatively to the above, the step of transmitting the bundled feedback information comprises 1) selecting an appropriate uplink control information format for transmission of the bundled feedback information to the radio base station, and 2) transmitting the bundled feedback information to the radio base station using the selected uplink control information format. Optionally, for the step of selecting the appropriate uplink control information format, a cell bundling group is assumed to be a cell such that the bundled feedback information of one cell bundling group is assumed to be feedback information of one cell.

According to an advantageous variant of the first aspect which can be used in addition or alternatively to the above, all of a particular type of cells, such as unlicensed cells, are associated with one of the at least one cell bundling groups. In one particular example, the bundled feedback information for the cell bundling group is transmitted separately from feedback information for other cells by using another transmission of an uplink control information format; alternatively, the bundled feedback information for the cell bundling group is transmitted together with feedback information for other cells by using the same transmission of a uplink control information format.

According to an advantageous variant of the first aspect which can be used in addition or alternatively to the above, the user equipment is provided with information on the definition of the at least one cell bundling group, preferably by higher-layer signaling from the radio base station.

According to an advantageous variant of the first aspect which can be used in addition or alternatively to the above, the at least two cells at least comprise a primary cell, wherein the step of transmitting the bundled feedback information of each cell bundling group to the radio base station is performed via the primary cell. According to an advantageous variant of the first aspect which can be used alternatively to the above, at least two uplink control cell groups are defined for the user equipment to support transmission of uplink control information via several cells, by associating each of the at least two uplink control cell groups with a different cell to be used for transmitting the uplink control information, and associating each of the at least two cells with one out of the at least two uplink control cell groups for associating uplink control information for the respective cell to an uplink control cell group. Furthermore, for each uplink control information the following step is performed: determining that cell for transmitting the respective uplink control information that is associated with that uplink control cell group with which the uplink control information is associated. Moreover, all cells associated with one of the at least one cell bundling group are associated with one of the at least two uplink control cell groups such that each of the at least one cell bundling groups is associated with one of the at least two uplink control cell groups. The step of transmitting the bundled feedback information includes the steps of 1) determining that cell that is associated with that uplink control cell group with which the cell bundling group is associated, and 2) transmitting the bundled feedback information via the determined cell to the radio base station.

According to an advantageous variant of the first aspect which can be used in addition or alternatively to the above, the user equipment is operating the at least two cells in Frequency Division Duplex, FDD, where feedback information for a downlink transmission is transmitted by the user equipment a pre-determined amount of time after receiving the downlink transmission. In this case, the step of bundling for each cell bundling group comprises: for each subframe, bundling the generated feedback information pending to be transmitted within the respective subframe across those cells being associated with the respective cell bundling group. This is done so as to generate bundled feedback information per subframe and per cell bundling group.

According to an advantageous variant of the first aspect which can be used alternatively to the above, the user equipment is operating each of the at least two cells in accordance with one out of a plurality of Time Division Duplex, TDD, configurations defining for each radio frame the subframes of the radio frame as an uplink subframe, a downlink subframe, or special subframe. For each of the plurality of TDD configurations pre-determined feedback timing information defines for each uplink subframe whether and for which previous downlink subframe(s) feedback information is to be transmitted in the respective uplink subframe. The method comprises the following steps being performed for each uplink subframe of that cell via which the bundled feedback information is to be transmitted:

for each cell, generating an item of feedback information for each of the previous downlink subframe(s) as defined by the pre-determined feedback timing information for the respective uplink subframe, the step of bundling the feedback information for each cell bundling group comprises:

bundling the generated feedback information items across those cells, that are associated with the respective cell bundling group, in a successive order of the feedback information items such that the feedback information items of the same order are bundled.

This is done so as to generate bundled feedback information items in the same successive order per uplink subframe, per cell bundling group and per order of feedback information items.

Optionally, the step of transmitting the bundled feedback information transmits the per-order-bundled feedback information of each cell bundling group together in an uplink control information format in the uplink subframe. Still optionally, the order of the feedback information items is based on the pre-determined feedback timing information for the respective uplink subframe.

According to an advantageous variant of the first aspect which can be used in addition or alternatively to the above, the user equipment is operating each of the at least two cells in accordance with one out of a plurality of Time Division Duplex, TDD, configurations defining for each radio frame the subframes of the radio frame as an uplink subframe, a downlink subframe, or special subframe. For each of the plurality of TDD configurations pre-determined feedback timing information defines for each uplink subframe whether and for which previous downlink subframe(s) feedback information is to be transmitted in the respective uplink subframe. The method comprises the following steps being performed for each uplink subframe of that cell via which the bundled feedback information is to be transmitted:

for each cell, generating an item of feedback information for each of the previous downlink subframe(s) as defined by the pre-determined feedback timing information for the respective uplink subframe, the step of bundling the feedback information for each cell bundling group comprises: bundling the generated feedback information items within each cell being associated with the respective cell bundling group such that the feedback information items of the same cell are bundled.

This is done so as to generate bundled feedback information per uplink subframe, per cell bundling group and per cell.

Optionally, the step of transmitting the bundled feedback information transmits the per-cell-bundled feedback information of each cell bundling group together in an uplink control information format in the uplink subframe. Still optionally, the per-cell-bundled feedback information is concatenated within each cell bundling group in an increasing order of the index of the respective cell.

According to another embodiment a user equipment is provided which provides feedback information of a retransmission protocol to a radio base station in a mobile communication system. The UE is configured with at least two cells, and at least one cell bundling group is defined for the user equipment such that one of the at least one cell bundling group is associated with at least two out of the at least two cells. The user equipment is in communication with the radio base station to receive downlink transmissions via at least one of the at least two cells, is configured to operate a retransmission protocol with the radio base station comprising the step of providing feedback information for the downlink communication via the at least two cells to the radio base station. A processor of the UE bundles, for each cell bundling group, feedback information generated in connection with those cells being associated with the respective cell bundling group so as to generate bundled feedback information per cell bundling group. A transmitter transmits the bundled feedback information of each cell bundling group to the radio base station.

According to an advantageous variant of the first aspect which can be used in addition or alternatively to the above, the transmitter performs the following when transmitting the bundled feedback information: 1) selecting an appropriate uplink control information format for transmission of the bundled feedback information to the radio base station, and 2) transmitting the bundled feedback information to the radio base station using the selected uplink control information format. Optionally, for the step of selecting the appropriate uplink control information format, a cell bundling group is assumed to be a cell such that the bundled feedback information of one cell bundling group is assumed to be feedback information of one cell.

According to an advantageous variant of the first aspect which can be used in addition or alternatively to the above, the at least two cells at least comprise a primary cell, wherein the transmitter transmits the bundled feedback information of each cell bundling group to the radio base station via the primary cell.

According to an advantageous variant of the first aspect which can be used alternatively to the above, at least two uplink control cell groups are defined for the user equipment to support transmission of uplink control information via several cells, by associating each of the at least two uplink control cell groups with a different cell to be used for transmitting the uplink control information, and associating each of the at least two cells with one out of the at least two uplink control cell groups for associating uplink control information for the respective cell to an uplink control cell group. As a result, for each uplink control information the processor is adapted to: determine that cell for transmitting the respective uplink control information that is associated with that uplink control cell group with which the uplink control information is associated. All cells associated with one of the at least one cell bundling group are associated with one of the at least two uplink control cell groups such that each of the at least one cell bundling groups is associated with one of the at least two uplink control cell groups, and the transmitter performs the following when transmitting the bundled feedback information: 1) determining that cell that is associated with that uplink control cell group with which the cell bundling group is associated, and 2) transmitting the bundled feedback information via the determined cell to the radio base station.

According to an advantageous variant of the first aspect which can be used in addition or alternatively to the above, the user equipment is operating the at least two cells in Frequency Division Duplex, FDD, where feedback information for a downlink transmission is transmitted by the user equipment a pre-determined amount of time after receiving the downlink transmission. The processor performs the bundling for each cell bundling group for each subframe, by bundling the generated feedback information pending to be transmitted within the respective subframe across those cells being associated with the respective cell bundling group. This is done so as to generate bundled feedback information per subframe and per cell bundling group.

According to an advantageous variant of the first aspect which can be used alternatively to the above, the user equipment is operating each of the at least two cells in accordance with one out of a plurality of Time Division Duplex, TDD, configurations defining for each radio frame the subframes of the radio frame as an uplink subframe, a downlink subframe, or special subframe. For each of the plurality of TDD configurations pre-determined feedback timing information defines for each uplink subframe whether and for which previous downlink subframe(s) feedback information is to be transmitted in the respective uplink subframe. The processor performs the following for each uplink subframe of that cell via which the bundled feedback information is to be transmitted:

for each cell, generating an item of feedback information for each of the previous downlink subframe(s) as defined by the pre-determined feedback timing information for the respective uplink subframe, wherein the processor is adapted to perform the bundling of the feedback information for each cell bundling group by:

bundling the generated feedback information items across those cells, that are associated with the respective cell bundling group, in a successive order of the feedback information items such that the feedback information items of the same order are bundled.

This is done so as to generate bundled feedback information items in the same successive order per uplink subframe, per cell bundling group and per order of feedback information items.

Optionally, the transmitter is adapted to transmit the per-order-bundled feedback information of each cell bundling group together in an uplink control information format in the uplink subframe. Still optionally, the order of the feedback information items is based on the pre-determined feedback timing information for the respective uplink subframe.

According to an advantageous variant of the first aspect which can be used alternatively to the above, the user equipment is operating each of the at least two cells in accordance with one out of a plurality of Time Division Duplex, TDD, configurations defining for each radio frame the subframes of the radio frame as an uplink subframe, a downlink subframe, or special subframe. For each of the plurality of TDD configurations pre-determined feedback timing information defines for each uplink subframe whether and for which previous downlink subframe(s) feedback information is to be transmitted in the respective uplink subframe. The processor performs the following for each uplink subframe of that cell via which the bundled feedback information is to be transmitted:

for each cell, generating an item of feedback information for each of the previous downlink subframe(s) as defined by the pre-determined feedback timing information for the respective uplink subframe, wherein the processor performs bundling of the feedback information for each cell bundling group by: bundling the generated feedback information items within each cell being associated with the respective cell bundling group such that the feedback information items of the same cell are bundled.

This is done so as to generate bundled feedback information per uplink subframe, per cell bundling group and per cell.

Optionally, the transmitter is adapted to transmit the per-cell-bundled feedback information of each cell bundling group together in an uplink control information format in the uplink subframe. Still optionally, the per-cell-bundled feedback information is concatenated within each cell bundling group in an increasing order of the index of the respective cell.

According to an embodiment, a radio base station is provided for receiving, from a user equipment, feedback information of a retransmission protocol. The user equipment is configured with at least two cells, and at least one cell bundling group is defined for the user equipment such that one of the at least one cell bundling group is associated with at least two out of the at least two cells. The user equipment is in communication with the radio base station to receive downlink transmissions via at least one of the at least two cells. The radio base station is configured to operate a retransmission protocol with the user equipment comprising the step of receiving feedback information for the downlink communication via the at least two cells from the user equipment. A receiver of the radio base station receives bundled feedback information of each cell bundling group from the user equipment. The bundled feedback information is generated by the user equipment by bundling, for each cell bundling group, feedback information generated in connection with those cells being associated with the respective cell bundling group so as to generate bundled feedback information per cell bundling group.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing, by a user equipment, feedback information of a retransmission protocol to a radio base station in a mobile communication system, wherein the user equipment is configured with at least two cells, and at least one cell bundling group is defined for the user equipment such that one of the at least one cell bundling group is associated with at least two out of the at least two cells, wherein the user equipment is in communication with the radio base station and receives downlink transmissions via at least one of the at least two cells, and the user equipment is configured to operate the retransmission protocol with the radio base station and provide feedback information for the downlink communication via the at least two cells to the radio base station, wherein the user equipment is operating in each of the at least two cells in accordance with one out of a plurality of Time Division Duplex, TDD, configurations defining for each radio frame the subframes of the radio frame as an uplink subframe, a downlink subframe, or special subframe, wherein for each of the plurality of TDD configurations pre-determined feedback timing information defines for each uplink subframe whether and for which one or more previous downlink subframe(s) feedback information is to be transmitted in the respective uplink subframe, the method being performed by the user equipment for each uplink subframe of one a cell via which the bundled feedback information is to be transmitted, the method comprising:

for each cell, generating an item of feedback information for each of the previous downlink subframe(s) as defined by the pre-determined feedback timing information for the respective uplink subframe, for each cell bundling group, bundling feedback information generated in connection with those cells being associated with the respective cell bundling group so as to generate bundled feedback information per cell bundling group, and transmitting the bundled feedback information of each cell bundling group to the radio base station.

2. The method according to claim 1, wherein the transmitting of the bundled feedback information comprises:

selecting an appropriate uplink control information format for transmission of the bundled feedback information to the radio base station, and transmitting the bundled feedback information to the radio base station using the selected uplink control information format, wherein, for the selecting of the appropriate uplink control information format, a cell bundling group is assumed to be a cell such that the bundled feedback information of one cell bundling group is assumed to be feedback information of one cell.

3. The method according to claim 1, wherein all of a particular type of cells, including unlicensed cells, are associated with one of the at least one cell bundling groups, wherein:

the bundled feedback information for the cell bundling group is transmitted separately from feedback information for other cells by using another transmission of an uplink control information format, or the bundled feedback information for the cell bundling group is transmitted together with feedback information for other cells by using the same transmission of an uplink control information format.

4. The method according to claim 1, wherein the user equipment is provided with information on the definition of the at least one cell bundling group, by higher-layer signaling from the radio base station.

5. The method according to claim 1, wherein the at least two cells comprise a primary cell, wherein the transmitting of the bundled feedback information of each cell bundling group to the radio base station is performed via the primary cell, or wherein at least two uplink control cell groups are defined for the user equipment to support transmission of uplink control information via several cells, by:

associating each of the at least two uplink control cell groups with a different cell to be used for transmitting the uplink control information, and associating each of the at least two cells with one out of the at least two uplink control cell groups for associating uplink control information for the respective cell to an uplink control cell group, for each uplink control information: determining the cell for transmitting the respective uplink control information that is associated with that uplink control cell group with which the uplink control information is associated, wherein all cells associated with one of the at least one cell bundling group are associated with one of the at least two uplink control cell groups such that each of the at least one cell bundling groups is associated with one of the at least two uplink control cell groups, and the transmitting of the bundled feedback information includes:

determining the cell that is associated with that uplink control cell group with which the cell bundling group is associated, and transmitting the bundled feedback information via the determined cell to the radio base station.

6. The method according to claim 1, wherein the bundling of the feedback information for each cell bundling group comprises: bundling the generated feedback information items across those cells, that are associated with the respective cell bundling group, in a successive order of the feedback information items such that the feedback information items of the same order are bundled, so as to generate bundled feedback information items in the same successive order per uplink subframe, per cell bundling group and per order of feedback information items, wherein the transmitting of the bundled feedback information includes transmitting the per-order-bundled feedback information of each cell bundling group together in an uplink control information format in the uplink subframe, and wherein the order of the feedback information items is based on the pre-determined feedback timing information for the respective uplink subframe.

7. The method according to claim 1, wherein the bundling of the feedback information for each cell bundling group comprises: bundling the generated feedback information items within each cell being associated with the respective cell bundling group such that the feedback information items of the same cell are bundled, so as to generate bundled feedback information per uplink subframe, per cell bundling group and per cell, wherein the transmitting of the bundled feedback information includes transmitting the per-cell-bundled feedback information of each cell bundling group together in an uplink control information format in the uplink subframe, and wherein the per-cell-bundled feedback information is concatenated within each cell bundling group in an increasing order of the index of the respective cell.

8. A user equipment that provides feedback information of a retransmission protocol to a radio base station in a mobile communication system, wherein the user equipment is configured with at least two cells, and at least one cell bundling group is defined for the user equipment such that one of the at least one cell bundling group is associated with at least two out of the at least two cells, wherein the user equipment is in communication with the radio base station and receives downlink transmissions via at least one of the at least two cells, and the user equipment is configured to operate the retransmission protocol with the radio base station and provide feedback information for the downlink communication via the at least two cells to the radio base station, wherein the user equipment is operating in each of the at least two cells in accordance with one out of a plurality of Time Division Duplex, TDD, configurations defining for each radio frame the subframes of the radio frame as an uplink subframe, a downlink subframe, or special subframe, wherein for each of the plurality of TDD configurations pre-determined feedback timing information defines for each uplink subframe whether and for which previous downlink subframe(s) feedback information is to be transmitted in the respective uplink subframe, the user equipment comprising:
 a processor which, in operation, bundles for each uplink subframe of a cell via which the bundled feedback information is to be transmitted, for each cell bundling group, feedback information generated in connection with those cells being associated with the respective cell bundling group so as to generate bundled feedback information per cell bundling group, and, for each cell, generates an item of feedback information for each of the previous downlink subframe(s) as defined by the pre-determined feedback timing information for the respective uplink subframe, and
 a transmitter which, in operation, transmits the bundled feedback information of each cell bundling group to the radio base station.

9. The user equipment according to claim 8, wherein the transmitter, when transmitting the bundled feedback information:
 selects an appropriate uplink control information format for transmission of the bundled feedback information to the radio base station, and
 transmits the bundled feedback information to the radio base station using the selected uplink control information format,
 wherein, when the transmitter selects the appropriate uplink control information format, a cell bundling group is assumed to be a cell such that the bundled feedback information of one cell bundling group is assumed to be feedback information of one cell.

10. The user equipment according to claim 8, wherein the at least two cells at least comprise a primary cell, wherein the transmitter transmits the bundled feedback information of each cell bundling group to the radio base station via the primary cell, or
 wherein at least two uplink control cell groups are defined for the user equipment to support transmission of uplink control information via several cells,
 wherein each of the at least two uplink control cell groups is associated with a different cell to be used for transmitting the uplink control information, and each of the at least two cells is associated with one out of the at least two uplink control cell groups for associating uplink control information for the respective cell to an uplink control cell group,
 wherein the processor, for each uplink control information, determines a cell for transmitting the respective uplink control information that is associated with that uplink control cell group with which the uplink control information is associated,
 wherein all cells associated with one of the at least one cell bundling group are associated with one of the at least two uplink control cell groups such that each of the at least one cell bundling groups is associated with one of the at least two uplink control cell groups, and wherein the transmitter, when transmitting the bundled feedback information:
 determines the cell that is associated with that uplink control cell group with which the cell bundling group is associated, and
 transmits the bundled feedback information via the determined cell to the radio base station.

11. The user equipment according to claim 8, wherein the processor, in operation:
 bundles the generated feedback information items across those cells, that are associated with the respective cell bundling group, in a successive order of the feedback information items such that the feedback information items of the same order are bundled, and
 generates bundled feedback information items in the same successive order per uplink subframe, per cell bundling group and per order of feedback information items,
 wherein the transmitter, in operation, transmits the per-order-bundled feedback information of each cell bundling group together in an uplink control information format in the uplink subframe, and
 wherein the order of the feedback information items is based on the pre-determined feedback timing information for the respective uplink subframe.

12. The user equipment according to claim 8, wherein the processor, in operation:
 bundles the generated feedback information items within each cell being associated with the respective cell bundling group such that the feedback information items of the same cell are bundled, and
 generates bundled feedback information per uplink subframe, per cell bundling group and per cell,
 wherein the transmitter, in operation, transmits the per-cell-bundled feedback information of each cell bundling group together in an uplink control information format in the uplink subframe, and
 wherein the per-cell-bundled feedback information is concatenated within each cell bundling group in an increasing order of the index of the respective cell.

13. A radio base station that receives, from a user equipment, feedback information of a retransmission protocol, wherein the user equipment is configured with at least two cells, and at least one cell bundling group is defined for the user equipment such that one of the at least one cell bundling group is associated with at least two out of the at least two cells,
 wherein the user equipment is in communication with the radio base station and receives downlink transmissions via at least one of the at least two cells, and the radio base station is configured to receive feedback information for the downlink communication via the at least two cells from the user equipment,
 wherein the user equipment is operating each of the at least two cells in accordance with one out of a plurality of Time Division Duplex, TDD, configurations defining for each radio frame the subframes of the radio frame as an uplink subframe, a downlink subframe, or special subframe, wherein for each of the plurality of TDD configurations pre-determined feedback timing information defines for each uplink subframe whether and for which previous downlink subframe(s) feedback information is to be transmitted in the respective uplink subframe,
 wherein the user equipment bundles for each uplink subframe of a cell via which the bundled feedback information is to be transmitted, wherein the user equipment, for each cell, generates an item of feedback information for each of the previous downlink subframe(s) as defined by the pre-determined feedback timing information for the respective uplink subframe, wherein the radio base station comprises:
- a processor which, in operation, performs the retransmission protocol with the user equipment; and
- a receiver coupled to the processor, wherein the receiver, in operation, receives bundled feedback information of each cell bundling group from the user equipment, wherein the bundled feedback information is generated by the user equipment by: for each cell bundling group, bundling feedback information generated in connection with those cells being associated with the respective cell bundling group so as to generate bundled feedback information per cell bundling group.

* * * * *